United States Patent
Asai

(10) Patent No.: US 8,948,899 B2
(45) Date of Patent: Feb. 3, 2015

(54) SUBSTRATE PROCESSING SYSTEM, SUBSTRATE PROCESSING APPARATUS AND DISPLAY METHOD OF SUBSTRATE PROCESSING APPARATUS

(75) Inventor: Kazuhide Asai, Toyama (JP)

(73) Assignee: Hitachi Kokusai Electric Inc., Tokyo (JP)

(*) Notice: Subject to any disclaimer, the term of this patent is extended or adjusted under 35 U.S.C. 154(b) by 429 days.

(21) Appl. No.: 13/211,105

(22) Filed: Aug. 16, 2011

(65) Prior Publication Data

US 2012/0065763 A1  Mar. 15, 2012

(30) Foreign Application Priority Data

Sep. 13, 2010 (JP) ................................. 2010-204293

(51) Int. Cl.
G06F 19/00 (2011.01)
G01R 31/26 (2014.01)
G05B 23/02 (2006.01)

(52) U.S. Cl.
CPC ................................. *G05B 23/0221* (2013.01)
USPC .............. 700/121; 700/108; 700/110; 438/14

(58) Field of Classification Search
USPC .............................. 700/108, 110, 121; 438/14
See application file for complete search history.

(56) References Cited

U.S. PATENT DOCUMENTS

| | | | |
|---|---|---|---|
| 6,952,492 B2* | 10/2005 | Tanaka et al. ................. | 382/149 |
| 2004/0176868 A1 | 9/2004 | Haga et al. | |
| 2009/0253222 A1* | 10/2009 | Morisawa et al. ................ | 438/9 |
| 2010/0214296 A1* | 8/2010 | Kawamura .................... | 345/440 |
| 2010/0215247 A1* | 8/2010 | Kitamura et al. ............ | 382/149 |

FOREIGN PATENT DOCUMENTS

| | | |
|---|---|---|
| JP | 4044443 B2 | 11/2007 |
| JP | 2007-324316 A | 12/2007 |
| JP | 2008-034769 A | 2/2008 |
| JP | 2009-290158 A | 12/2009 |

* cited by examiner

*Primary Examiner* — Ronald Hartman, Jr.
(74) *Attorney, Agent, or Firm* — Volpe and Koenig, P.C.

(57) ABSTRACT

Provided are a substrate processing apparatus, a display method thereof, and a substrate processing system capable of detecting any change in the condition of each component of a substrate processing apparatus. In the substrate processing system including the substrate processing apparatus for processing a substrate and a group management apparatus connected thereto, the substrate processing apparatus is configured to acquire monitor data representing at least the condition of each component of the substrate processing apparatus, aggregate a plurality of the monitor data to generate package data including at least one of a maximum value, an average value, and a minimum value of the monitor data, and transmit the package data to the group management apparatus. The group management apparatus is configured to receive the package data from the substrate processing apparatus and readably store the same therein.

8 Claims, 17 Drawing Sheets

FIG. 9A

Experimental value

| No | TIME[s] | temperature[℃] |
|---:|---:|---:|
| 1 | 0 | 701 |
| 2 | 0.2 | 701 |
| 3 | 0.4 | 701 |
| 4 | 0.6 | 701 |
| 5 | 0.8 | 701 |
| 6 | 1 | 702 |
| 7 | 1.2 | 702 |
| 8 | 1.4 | 702 |
| 9 | 1.6 | 702 |
| 10 | 1.8 | 702 |
| 11 | 2 | 703 |
| 12 | 2.2 | 703 |
| 13 | 2.4 | 706 |
| 14 | 2.6 | 700 |
| 15 | 2.8 | 703 |
| 16 | 3 | 702 |
| 17 | 3.2 | 702 |
| 18 | 3.4 | 702 |
| 19 | 3.6 | 702 |
| 20 | 3.8 | 702 |

5 Hz graph of substrate processing apparatus

1 Hz graph of group management apparatus

FIG. 10A

| No | TIME[s] | MAXIMUM VALUE | AVERAGE VALUE | MINIMUM VALUE |
|---|---|---|---|---|
| 1 | 0.0 | 701 | 701 | 701 |
| 2 | 1.0 | 702 | 702 | 702 |
| 3 | 2.0 | 706 | 703 | 700 |
| 4 | 3.0 | 702 | 702 | 702 |

SUBSTRATE PROCESSING SYSTEM, SUBSTRATE PROCESSING APPARATUS AND DISPLAY METHOD OF SUBSTRATE PROCESSING APPARATUS

CROSS-REFERENCE TO RELATED APPLICATION

This application is based upon and claims the benefit of priority from Japanese Patent Application No. 2010-204293, filed on Sep. 13, 2010, the entire contents of which are incorporated herein by reference.

TECHNICAL FIELD

The present disclosure relates to a substrate processing system, a substrate processing apparatus, and a display method for the substrate processing apparatus.

BACKGROUND

In a substrate processing apparatus repeatedly performing a substrate processing process (batch process) based on a recipe, there exist a number of positions (e.g., at which a temperature sensor, a gas flow meter, a pressure gauge or the like are installed; referred to as "data generation positions" hereinafter). At such data generation positions, monitor data (indicating various data that includes time series data such as temperature, gas flow rate, pressure or the like) showing the progress state of the substrate processing process or running conditions of the substrate processing apparatus can be collected. In the case of employing a plurality of the substrate processing apparatuses, a group management apparatus (a high-level management apparatus) may be connected thereto via a network to integrally and effectively control the progress state of the substrate processing process and the conditions of the group of the substrate processing apparatuses. The group management apparatus is configured in such a way to receive the aforementioned monitor data showing the progress state of the substrate processing process and the running conditions of the substrate processing apparatus from each substrate processing apparatus and to store the monitor data thus received in a database (DB) to be readable for further processing.

Reducing a time interval of acquiring the monitor data increases the acquisition frequency of the monitor data (i.e., which improves monitor data granularity), which makes it possible to accurately detect the change in conditions of the respective components of the substrate processing apparatus. If, however, the acquisition frequency of the monitor data increases, the data amount to be acquired becomes greater. This requires more memory area or the like to thereby increase a processing load of the substrate processing apparatus and group management apparatus. In addition, the monitor data generated in the substrate processing apparatus is configured in a manner to be transmitted to the group management apparatus every time it is acquired. For this reason, an increase in the acquisition frequency of the monitor data causes the data amount of the entire substrate processing system to be greater although the increased amount of data per apparatus may be small. Accordingly, there is a possibility of increasing the network load.

To address the above issue, a conventional substrate processing apparatus has reduced the network load by transmitting only a part of the acquired monitor data, specifically only the monitor data acquired in a predetermined cycle to the group management apparatus. In such a method, however, the monitor data is thinned out and thus the complete monitor data is not transmitted to the group management apparatus. Thus, this makes it difficult to monitor every change in condition of each component of forming the substrate processing apparatus.

SUMMARY

The present disclosure provides a substrate processing system, a substrate processing apparatus and a display method of the substrate processing apparatus, wherein the substrate processing system is capable of detecting the change in the condition of each component of forming the substrate process apparatus while suppressing an amount of data from being increased.

According to one embodiment of the present disclosure, provided is a substrate processing system including a substrate processing apparatus configured to process a substrate and a group management apparatus that is connected to the substrate processing apparatus, wherein the substrate processing apparatus is configured to acquire a plurality of monitor data at least representing the condition of each component of the substrate processing apparatus; aggregate the plurality of the monitor data to generate package data including at least one of a maximum value, an average value, and a minimum value of the monitor data; and transmit the package data to the group management apparatus, wherein the group management apparatus is configured to receive and readably store the package data from the substrate processing apparatus.

According to another embodiment of the present disclosure, provided is a substrate processing apparatus configured to process a substrate, wherein the substrate processing apparatus acquire a plurality of monitor data representing at least the condition of each component of the substrate processing apparatus, and generates package data including at least three calculation data of a maximum value, an average value, and a minimum value associated with first monitor data selected from the plurality of monitor data.

According to still another embodiment of the present disclosure, provided a display method of a substrate processing apparatus, wherein the substrate processing apparatus acquires a plurality of monitor data representing at least the condition of each component of the substrate processing apparatus; generates package data including at least three calculation data of a maximum value, an average value, and a minimum value associated with first monitor data selected from the plurality of the monitor data; and converts the package data into a graphical representation for display.

According to the present disclosure, it is possible to detect the change in the condition of each component of the substrate processing apparatus while restraining the amount of data from being increased. In other words, while suppressing the increase of the data amount, it is possible to detect the change in the condition of each component of the substrate processing apparatus with precision comparable to the case of analyzing the entire monitor data.

BRIEF DESCRIPTION OF THE DRAWINGS

FIGS. 9A to 9C are views explaining the effects according to the present embodiment.

FIGS. 10A and 10B are views explaining the effects according to the present embodiment.

DETAILED DESCRIPTION (A First Embodiment According to the Present Disclosure)

Hereinafter, a first embodiment of the present disclosure will be described with reference to the drawings.

(1) Configuration of a Substrate Processing Apparatus

Figure 12:
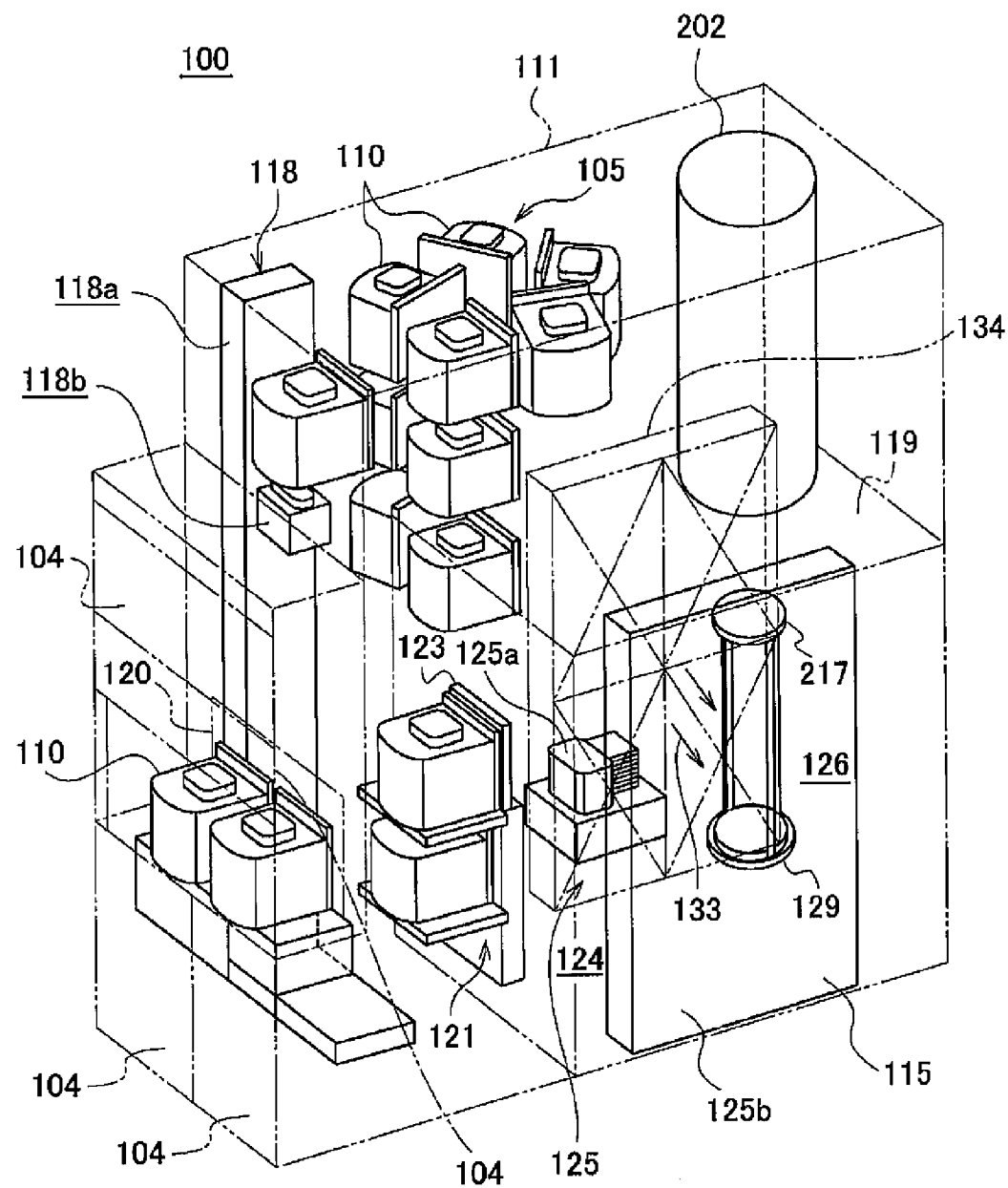
FIG. 12 is a perspective view of a substrate processing apparatus according to the first embodiment of the present disclosure.
Figure 13:
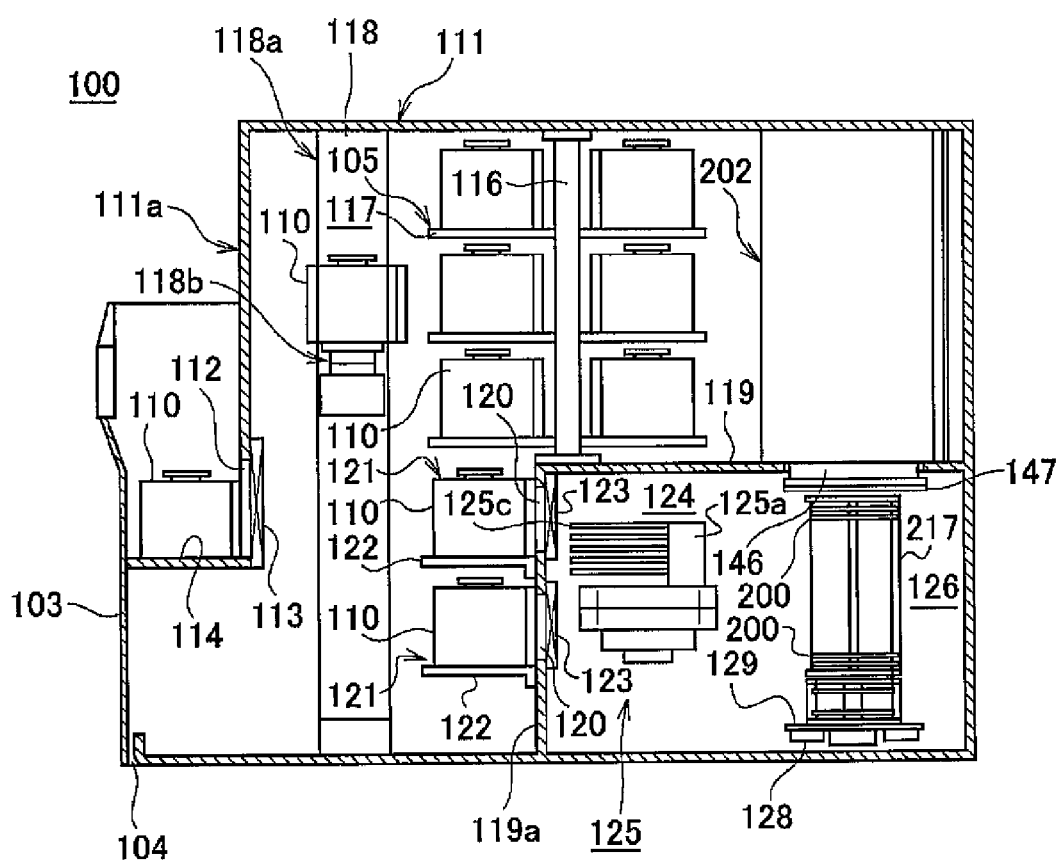
FIG. 13 is a side perspective view of the substrate processing apparatus according to the first embodiment of the present disclosure.

The configuration of the substrate processing apparatus 100 according to the present embodiment will now be described with reference to FIGS. 12 and 13. FIG. 12 is a perspective view of the substrate processing apparatus according to the first embodiment of the present disclosure. FIG. 13 is a side perspective view of the substrate processing apparatus according to the first embodiment of the present disclosure. Further, the substrate processing apparatus 100 according to the present embodiment is structured as a vertical type apparatus that carries out, e.g., an oxidation process, a reduction process, CVD process or the like on a substrate such as a wafer.

As shown in FIGS. 12 and 13, the substrate processing apparatus 100 includes a housing 111 used as a pressure resistant vessel. The housing 111 has a front wall 111a. The front wall 111a is provided at its front portion with a front maintenance opening 103 used as an opening for maintenance tasks. At the front maintenance opening 103, there are provided a pair of front maintenance doors 104 configured to open and close the maintenance opening 103. A pod (a substrate container) 110 in which wafers (substrates) 200 or the like are accommodated is used as a carrier when transferring the wafers 200 from/into the housing 111.

The front wall 111a of the housing 111 is provided with a pod loading/unloading opening (a substrate container loading/unloading opening) 112 through which an inside and an outside of the housing 111 are in communicated with each other. The pod loading/unloading opening 112 is configured to be opened and closed by a front shutter (a mechanism for opening and closing the loading/unloading opening of the substrate container) 113. Installed at a front side of the pod loading/unloading opening 112 is a loading port (a substrate container carrying board) 114. A top of the loading port 114 is configured to mount the pod 110 thereon so that the pod 110 is aligned thereto. The pod 110 is configured to be transferred to the top of the loading port 114 by a transfer device (not shown) in the process.

At an upper portion of an approximately center part extending along a horizontal direction within the housing 111A, there is installed a rotational pod shelf (a substrate container holding shelf) 105. The rotational pod shelf 105 is configured to hold a plurality of pods 110 thereon. The rotational pod shelf 105 includes a column 116 that is vertically disposed and is intermittently rotated in the horizontal plane, and a plural number of shelf boards (substrate containers holding boards) 117 that are disposed to be radially supported respectively at an upper, a middle and a lower stages of the column 116. The plural number of shelf boards 117 are respectively configured to hold a plurality of pods thereon.

Provided between the loading port 114 and the rotational pod shelf 105 in the housing 111 is a pod transferring device (a substrate container transferring device) 118. The pod transferring device 118 includes a pod elevator (a substrate elevation mechanism) 118a configured to move up and down the pods 110 held thereon, and a pod transferring mechanism (a substrate container transferring mechanism) 118b as a transferring mechanism. The pod transferring device 118 is configured to transfer the pod 110 between the loading port 114, the rotational pod shelf 105, and a pod opener (an substrate container lid member opening/closing mechanism) 121 through continuous operations of the pod elevator 118a and the pod transferring mechanism 118b.

A lower part of the interior of the housing 111 is provided with a sub-housing 119 that is formed to extend from the approximately center part of the housing 111 to a rear part thereof in a horizontal direction in the housing 111. A pair of wafer loading/unloading ports (substrate loading/unloading ports) 120 configured to transfer the wafers 200 from/into the sub-housing 119 are provided vertically at upper and lower stages on a front wall 119a of the sub-housing 119. The upper and the lower wafer loading/unloading ports 120 are respectively provided with pod openers 121.

Each of the respective pod openers 121 has a pair of mounting tables 122 for mounting thereon pods 110 and a cap attaching and detaching mechanism (lid attaching and detaching mechanism) 123 configured to attach or detach a cap (a lid member) of the pod 110. The pod opener 121 is configured to selectively open or close a wafer gate of the pod 110 by attaching or detaching the cap of the corresponding pod 110 disposed on the mounting table 122 by means of the cap attaching and detaching mechanism 123.

The sub-housing 119 defines a transferring chamber 124 that is fluidically isolated from a space where the pod transferring device 118 and the rotational pod shelf 105 and the like are installed. A front-side section of the transferring chamber 124 is provided with a wafer transferring mechanism (substrate transferring mechanism) 125. The wafer transferring mechanism 125 includes a wafer transferring device (substrate transferring device) 125a configured to rotate or linearly move the wafer 200 in a horizontal direction, and a wafer transferring device elevator (substrate transferring device elevator) 125b configured to move up and down the wafer transferring device 125a. As illustrated in FIG. 12, the wafer transferring device elevator 125b is disposed between a right portion of the front section of the transferring chamber 124 in the sub-housing 119 and a right portion of the housing 111. The wafer transferring device 125a includes tweezers (substrate holding members) 125c used as a mounting unit of the wafer 200. The continuous operations of the wafer transferring device elevator 125b and the wafer transferring device 125a allows the wafers 200 to be loaded (in a charging operation) and unloaded (in a discharging operation) into/from a boat (substrate holding tool) 217.

A rear-side section of the transferring chamber 124 is provided with a waiting station 126 configured to accommodate the boat 217 waiting for processing. A process furnace 202 used as the substrate processing system is provided above the waiting station 126. A lower end portion of the process furnace 202 is configured to be opened and closed by means of a furnace opening shutter (furnace opening and closing shutter) 147.

As depicted in FIG. 12, a boat elevator (substrate holding tool elevating mechanism) 115 configured to lift the boat 217 is installed between a right end portion of the waiting station 126 of the sub-housing 119 and the right end portion of the housing 111. A sealing cap 219 serving as a cover is horizontally disposed on an arm 128 serving as a coupling member that is coupled to a platform of the boat elevator 115. The sealing cap 219 is configured to vertically support the boat 217 to thereby close the lower end part of the process furnace 202.

The boat 217 includes a number of holding members. The plurality of holding members of the boat 217 are configured to horizontally hold a plurality of wafers 200 (for example, 50 to 125 sheets of wafers 200), respectively, so that the wafers 200 are concentrically aligned along a vertical direction.

As schematically shown in FIG. 12, a clean unit 134, which is configured with a supply fan for supplying clean air 133 (e.g., a cleaned atmosphere or an inert gas) and a dust-proof filter, is provided in a left part of the transferring chamber 124 opposite another part of the transferring chamber 124 in which the wafer transferring device elevator 125b and the boat elevator 115 are provided. A notch alignment device (not shown) serving as a substrate alignment device for aligning positions of the wafers 200 in a circumferential direction is disposed between the wafer transferring device 125a and the clean unit 134.

Clean air 133 blown out from the clean unit 134 passes through the notch alignment device (not shown), the wafer transferring device 125a and the surrounding of the boat 217 disposed in the waiting station 126. Thereafter, the clean air 133 blows through a duct (not shown) to be exhausted outside the housing 111 or to be circulated into a first side (supply side) of the suction side of the clean unit 134 so that the clean air 133 is blown out into the transferring chamber 124 again by the clean unit 134.

(2) Operation of the Substrate Processing Apparatus

Next, the operation of the substrate processing apparatus 100 according to the present embodiment will now be described with reference to FIGS. 12 and 13.

As shown in FIGS. 12 and 13, when the pod 110 is supplied to the loading port 114, a pod loading/unloading opening 112 is opened by the front shutter 113. Thereafter, the pod 110 on the loading port 114 is loaded from the pod loading/unloading opening 112 into the housing 111 by the pod transferring device 118.

The pod 110 loaded into the housing 111 is automatically transferred onto a designated shelf board 117 of the rotational pod shelf 105 by the pod transferring device 118 and is stored thereon temporarily. In this manner, the pod 110 is unloaded from the top of the shelf boards 117 onto the mounting table 122 of one of the pod openers 121. Alternatively, the pod 110 loaded into the housing 111 may be directly carried onto the mounting table 122 of the pod opener 121 through the pod transferring device 118. At this time, the wafer loading/unloading ports 120 of the pod openers 121 is closed by means of the cap attaching and detaching mechanism 123, and clean air 133 flows in the transferring chamber 124 to be filled therein. For instance, by filling the transferring chamber 124 with nitrogen gas used as the clean air 133, oxygen concentration in the transferring chamber 124 becomes e.g., 20 ppm or less which is slightly lower than the oxygen concentration of the inside (atmospheric air) of the housing 111.

When the pod 110 is mounted on the mounting table 122, an opening-side surface thereof is pressed against a peripheral portion of the wafer loading/unloading ports 120 that is located at the front wall 119a of the sub-housing 119. Then the cap of the pod 110 is detached by the cap attaching and detaching mechanism 123 to open the wafer gate. Subsequently, the wafers 200 are picked up from the pod 110 through the wafer gate by the tweezers 125c of the wafer transferring device 125a and are subjected to an orientation alignment process by the notch alignment device. Thereafter, the wafers 200 are loaded into the waiting station 126 that is disposed at a rear-side section of the transferring chamber 124 and are loaded (or charged) into the boat 217. The wafer transferring device 125a, after performing a loading operation of the wafers 200 into the boat 217, returns the pod 110 and loads subsequent wafers 200 into the boat 217.

While loading the wafers into the boat 217 by use of the wafer transferring mechanism 125 in the one pod opener 121 (e.g., the upper pod opener), another pod 110 is simultaneously transferred from the rotational pod shelf 105 onto the mounting table 122 of the other pod opener 121 (e.g., the lower pod opener) and is opened by means of the other pod opener 121. As such, the opening operations of the two pods 110 can be concurrently performed by the pod openers 121.

If a predetermined numbers of wafers 200 are charged into the boat 217, a lower end portion of the process furnace 202, which is closed by means of the furnace opening shutter 147, is opened by the furnace opening shutter 147. Subsequently, the sealing cap 219 is lifted upward by the boat elevator 115 whereby the boat 217 holding the group of wafers 200 therein is transferred (or loaded) into the process furnace 202.

After the loading operation is completed, the wafers 200 are subjected to predetermined processes in the process furnace 202. Once the predetermined processes are completed, the wafers 200 and the pods 110 are taken out from the housing 111 according to a sequence of operations which is reverse to the above-described operations, except for the wafer alignment in the notch alignment device (not shown). Specifically, the boat 217 holding therein the processed wafers 200 is discharged from the process furnace 202 and the pod 110 holding therein the processed wafers 200 is unloaded into the exterior of the housing 111.

(3) Configuration of the Process Furnace

Figure 14:
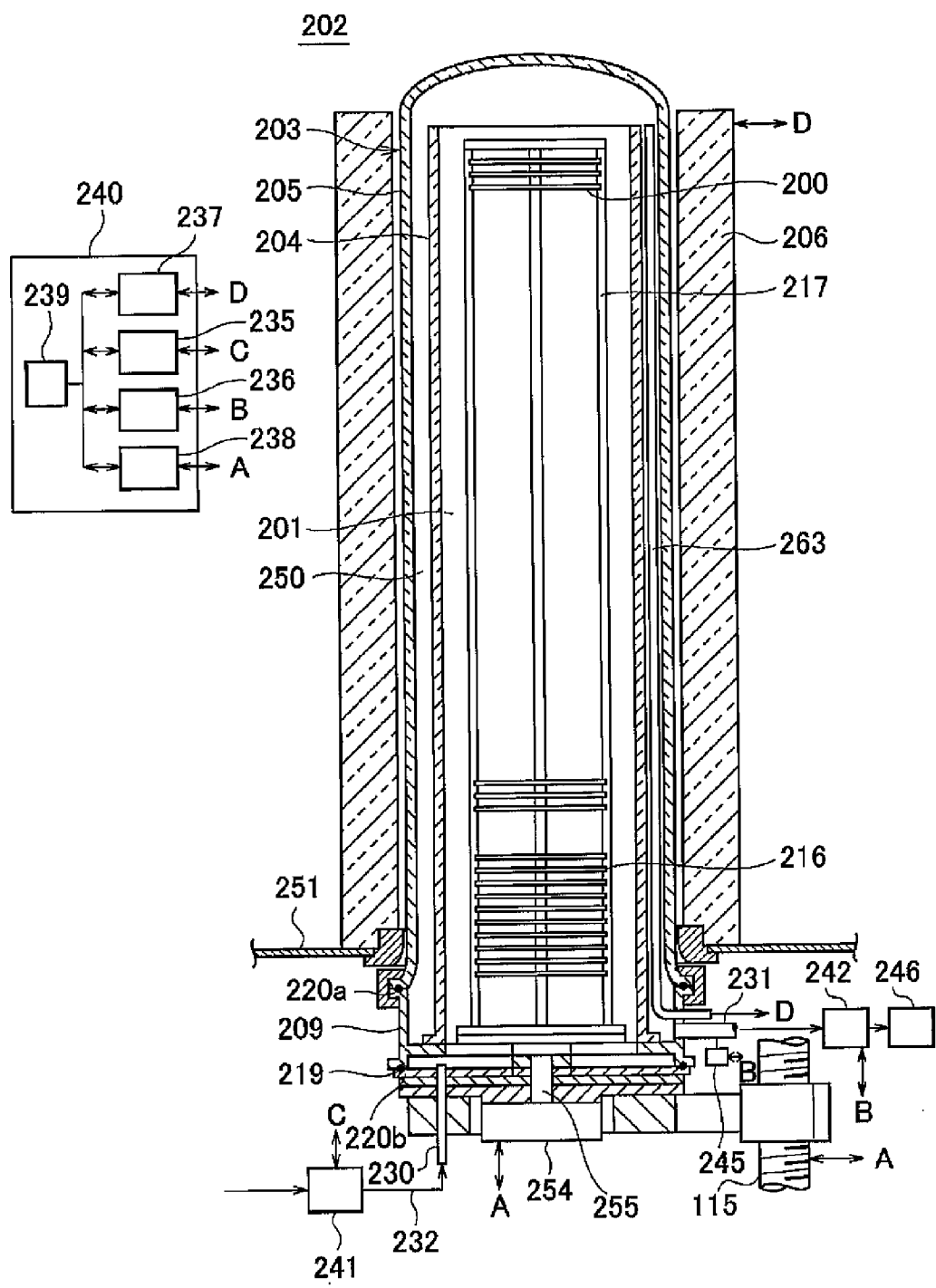
FIG. 14 is a longitudinal sectional view of a process furnace of the substrate processing apparatus according to the first embodiment of the present disclosure.

The following is a description of the configuration of the process furnace 202 according to the present embodiment with reference to FIG. 14. FIG. 14 is a longitudinal sectional view of the process furnace 202 of the substrate processing apparatus 100 according to the first embodiment of the present disclosure.

As demonstrated in FIG. 14, the process furnace 202 includes a process tube 203 used as a reaction tube. The process tube 203 includes an inner tube 204 used as an interior reaction tube and an outer tube 205 used as an exterior reaction tube, the outer tube 205 being provided outside the inner tube 204. The inner tube 204 is made of heat resistant material such as quartz ($SiO_2$), silicon carbide (SiC) or the like and is formed into a cylindrical shape whose top end and bottom end are opened. A cylindrical hollow portion in the inner tube 204 defines a process chamber 201 for processing the wafers 200 used as the substrates. The interior of the process chamber 201 is configured to accommodate a boat 217 which will be described in detail later. The outer tube 205 is concentrically arranged with the inner tube 204. The outer tube 205 has an inner diameter greater than an outer diameter of the inner tube 204 and is formed into a cylindrical hollow shape with a closed top end and an opened bottom end. The outer tube 205 is made of heat resistant material such as quartz, silicon carbide or the like.

Outside the process tube 203, there is provided with a heater 206 as a heating mechanism configured to surround a sidewall of the process tube 203. The heater 206 has a cylindrical shape and is vertically installed by being supported to a heater base 251 used as a support plate.

A bottom portion of the outer tube 205 is coupled to a manifold 209 which is concentrically aligned with the outer tube 205. The manifold 209 is made of, e.g., stainless steel or the like and is formed into a cylindrical shape with an open top end and an open bottom end. The manifold 209 is engaged with a bottom end of the inner tube 204 and a bottom of the outer tube 205 to support them. Further, between the manifold 209 and the outer tube 205, an O-ring acting 220a as a sealing member is interposed. The manifold 209 is configured to support the heater base 251 thereby holding the process tube 203 in a vertical state.

Connected to a sealing cap 219 which will be described later is a nozzle 230 used as a gas inlet portion to communicate with the interior of the process chamber 201. The nozzle 230 has an upstream end to which a downstream end of a gas supply tube 232 is connected. Connected to an upstream of the gas supply tube 232 (opposing the side connected to the nozzle 230) are a process gas supply source (not shown) and an inactive gas supply source (not shown) or the like via a MFC (Mass Flow Controller) 241 used as a gas flow rate controller. Electrically connected to the MFC 241 is a gas flow rate control unit 235. The gas flow rate control unit 235 controls the MFC so that a flow rate of gas being supplied into the process chamber 201 is controlled at a desired flow rate at a desired timing.

The manifold 209 is provided with an exhaust pipe 231 for discharging an atmosphere inside the process chamber 201. The exhaust pipe 231 is arranged at a bottom end portion of a cylindrical space 250 defined by a gap formed between the inner tube 204 and the outer tube 205 to communicate therewith. Sequentially connected to a downstream side of the exhaust pipe 231 (opposing the side connected to the manifold 209) are a pressure sensor 245 used as a pressure detector, a pressure controller 242 formed of, e.g., APC (Auto Pressure Controller), and a vacuum exhaust device 246 such as a vacuum pump or the like from the upstream side thereof in this order. Electrically connected to the pressure controller 242 and the pressure sensor 245 is a pressure control unit 236. The pressure control unit 236 controls the pressure controller 242 based on the pressure value detected by the pressure sensor 245 so that an inner pressure of the process chamber 201 becomes a desired pressure at a desired timing.

A bottom of the manifold 209 is provided with the sealing cap 219 as a furnace opening lid member configured to seal the open bottom end of the manifold 209 herimetically. The sealing cap 219 is configured to be vertically in contact with a bottom end of the manifold 209 from below. The sealing cap 219 is made of a metal such as, e.g., a stainless steel and formed into disc shape. A top surface of the sealing cap 219 is provided with an O-ring 220b to be contact with the bottom end of the manifold 209, the O-ring 220b being used as a sealing member. An opposite side to the process chamber 201 in the vicinity of the central portion of the sealing cap 219 is provided with a rotational mechanism 254 for rotating the boat 217. The rotational mechanism 254 has a shaft 255 that passes through the sealing cap 219 to support the boat 217 from below. The rotational mechanism 254 is configured to allow the wafers 200 to rotate in conjunction with the rotation of the boat 217. The sealing cap 219 is configured to move up and down in the vertical direction by means of the boat elevator 115 used as the elevator mechanism, the boat elevator 115 being vertically installed at an outside of the process tube 203. The vertical movement of the sealing cap 219 enables the boat 217 to be transferred into and from the process chamber 201. Electrically connected to the rotational mechanism 254 and the boat elevator 115 is a mechanism control unit 238. The mechanism control unit 238 controls the rotational mechanism 254 and the boat elevator 115 to perform a particular operation at a desired timing.

As explained above, the boat 217 as the substrate holding tool is so configured that the plural number of wafers 200 are horizontally stacked in multiple stages in a state of being concentrically aligned with one another while maintaining the horizontal posture. The boat 217 is made of a heat resistant material such as, e.g., quartz or silicon carbide. Installed at the lower portion of the boat 217 is a plurality of heat insulating plates 216 of a circular plate shape stacked in multiple levels while maintaining the horizontal posture, the heat insulating plates 216 used as a heat insulating member being made of a heat resistant material such as, e.g., quartz or silicon carbide. Such a configuration prevents heat from being transmitted from the heater 206 to the side of the manifold 209.

The inside of the process tube 203 is provided with a temperature sensor 263 used as a temperature detector. Electrically connected to the heater 206 and the temperature sensor 263 is a temperature control unit 237. The temperature control unit 237 adjusts the electrical power supply to the heater 206 based on the temperature information detected by the temperature sensor 263 in such a way that an inner temperature of the process chamber 201 has a desired temperature distribution at a desired timing.

The gas flow rate control unit 235, the pressure control unit 236, the mechanism control unit 238, and the temperature control unit 237 are electrically connected to a display device control unit 239 used as a main controller for controlling the entire operation of the substrate process apparatus (hereinafter, the gas flow rate control unit 235, the pressure control unit 236 and the temperature control unit 237 will be collectively referred to as an "I/O control unit"). The gas flow rate control unit 235, the pressure control unit 236, the mechanism control unit 238, the temperature control unit 237, and the display device control unit 239 used as a main controller collectively constitute a controller 240 for use in the substrate process apparatus. The configuration and operation of the controller 240 for use in the substrate process apparatus will be described later.

(4) Operation of the Process Furnace

The following is a description of a method of forming thin films on the wafers 200 using a CVD process by means of the process furnace 202 having the forgoing-described structure with reference to FIG. 14 as one example process of a semiconductor device manufacturing process, where the operation of each component of making up the substrate processing apparatus 100 is controlled by the controller 240.

As shown in FIG. 14, if a plural number of wafers 200 are charged into the boat 217 (in a wafer charging operation), the boat 217 holding the plural number of the wafers 200 is lifted by the boat elevator 115 to be transferred into the process chamber 201 (in a boat loading operation). Under this condition, the sealing cap 219 seals the bottom end of the manifold 209 via the O-ring 220b.

The vacuum exhaust device 246 evacuates the interior of the process chamber 201 so that the interior thereof becomes a desired pressure (or pressure level). At this time, the pressure controller 242 (specifically, the opening degree of a valve thereof) is feedback-controlled based on the pressure value measured by the pressure sensor 245. Further, the process chamber 201 is heated by the heater 206 in such a way that the interior thereof becomes a desired temperature. At this time, the amount of the electric power supply to the heater 206 is feedback-controlled based on the temperature value detected by the temperature sensor 263. Subsequently, the boat 217 and the wafers 200 are rotated by the rotational mechanism 254.

Subsequently, gas supplied from the process gas supply source (to be controlled to a desired flow rate by means of the MFC 241) flows through the gas supply tube 232 and is introduced from the nozzle 230 into the process chamber 201. The gas thus introduced flows upward in the process chamber 201 and is discharged from the open top end of the inner tube 204 to the cylindrical space 250 to be exhausted through the exhaust pipe 231. The gas then becomes in contact with the surface of respective wafers 200 while passing through the process chamber 201 and at this time the thin films are deposited thereon by the reaction of the thermal CVD.

When the preset process time period elapses, the inactive gas is fed from the inactive gas supply source and the atmosphere of the process chamber 201 is substituted with the inactive gas. At the same time, the inner pressure of the process chamber 201 is restored to the atmospheric pressure.

Thereafter, the bottom end of the manifold 209 is opened by the boat elevator 115 moving down the sealing cap 219 and at the same time, the boat 217 that holds the processed wafers 200 is transferred from the bottom end of the manifold 209 to the exterior of the process tube 203 (in a boat unloading operation). Next, the processed wafers 200 are taken out from the boat 217 and are stored in the pod 110 (in a wafer discharging operation).

(5) Configuration of the Controller for Use in the Substrate Process Apparatus

Figure 1:
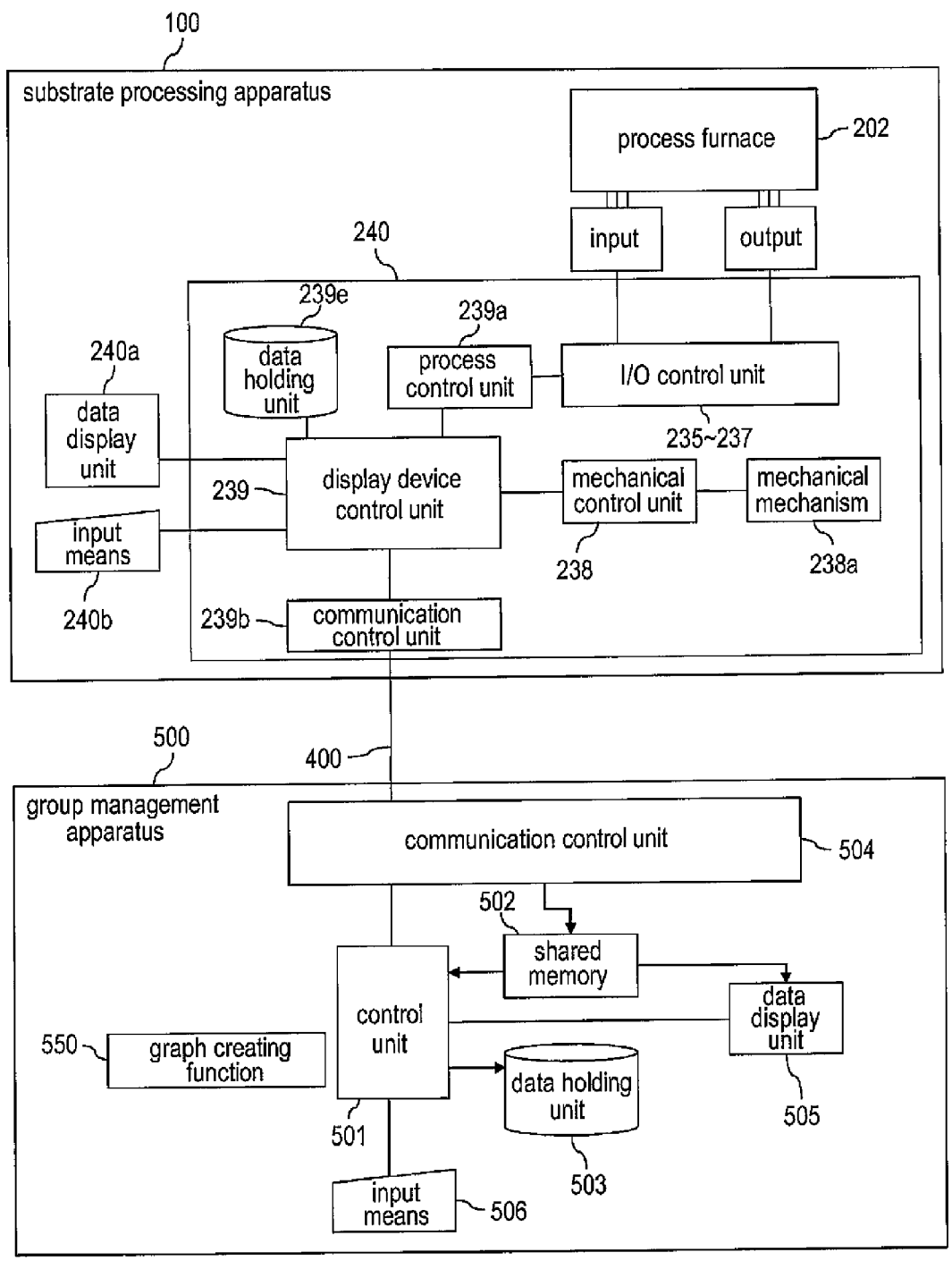
FIG. 1 is a block diagram of a substrate processing system according to a first embodiment of the present disclosure.

The controller 240 for use in the substrate process apparatus (simply referred to as "controller") according to the present embodiment will now be described with reference to FIG. 1. FIG. 1 is a block diagram of a substrate processing system according to the first embodiment of the present disclosure.

The controller 240 includes the above-mentioned I/O control unit (the gas flow rate control unit 235, the pressure control unit 236, and the temperature control unit 237) for controlling the process furnace 202, and a process control unit 239a that is connected to the I/O control unit so that they can exchange data with each other. The process control unit 239a is configured to control an operation of the process furnace 202 via the I/O control unit and simultaneously acquire (or read) the monitor data representing the condition of the process furnace 202 (e.g., temperature, gas flow rate, pressure or the like).

The controller 240 further includes the display device control unit 239 used as a main control unit that is connected to the process control unit 239a so that they can exchange data with each other. Respectively connected to the display device control unit 239 are a data display unit 240a such as a display or the like and an input means 240b such as a keyboard or the like. The display device control unit 239 is configured to receive input signals (e.g., input of operation commands) from the input means 240b manipulated by an operator and configured to display a condition displaying screen and an operation input receiving screen of the substrate processing apparatus 100 and the like on the data display unit 240a.

The controller 240 further includes the mechanism control unit 238 that is connected to the display device control unit 239 used as the main control unit so that they can exchange data with each other, and a mechanism unit I/O 238a that is connected to the mechanism control unit 238 so that they can exchange data with each other. The mechanism control unit 238 is configured to control the operation of each component of the substrate processing apparatus 100 via the mechanism unit I/O 238a and configured to simultaneously acquire (or read) the monitor data representing the condition of each component of the substrate processing apparatus 100 (for example, position, opening/closing state, whether it is in an activating state or waiting state, or the like).

The controller 240 further includes a data holding unit 239e that is connected to the display device control unit 239 used as the main control unit. The data holding unit 239e may store (or hold) programs for realizing various functions in controller 240, a process recipe defining process procedures and process conditions in the substrate processing process to be performed by using the process furnace 202, the monitor data, the package data which will be described later.

The package data is generated by aggregating a plurality of monitor data and includes at least one of a maximum value (Max), an average value (Ave), and a minimum value (Min). In the present embodiment, a description will be provided on a case where the package data include at least one of the maximum value, the average value and the minimum value. Further, in the present embodiment, data monitoring time period is delimited based on a predetermined cycle, and the monitor data acquired within the predetermined cycle is processed to generate the package data.

Figure 2:
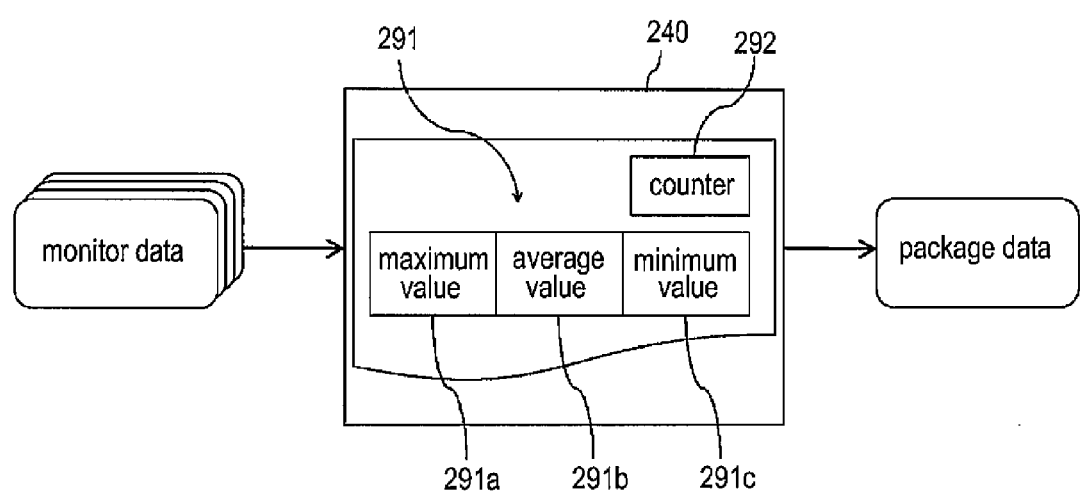
FIG. 2 illustrates a configuration of generating package data.

FIG. 2 illustrates a configuration of generating package data. As represented in FIG. 2, each of the values (maximum value, average value, and minimum value) included in the package data is obtained by processing the acquired monitor data. Specifically, the controller 240 performs a maximum value updating process, a minimum value updating process, a cumulative value updating process, an average value calculating process and the like on the monitor data, thereby generating each of the values (maximum value, average value, and minimum value) of the package data. The maximum value, average value, and minimum value thus generated are respectively stored in a maximum value storing area 291a, an average value storing area 291b, and a minimum value storing area 291c of a package data storing region 291 provided in the controller 240.

In the maximum value updating process, if a value of newly acquired monitor data is greater than a current maximum value that has been lastly updated, the current maximum value is updated using the newly acquired value. On the other hand, if a value of newly acquired monitor data is smaller than the current maximum value, the maximum value updating process is not conducted. In the minimum value updating process, if a value of newly acquired monitor data is smaller than a current minimum value that has been lastly updated, the current minimum value is updated using the newly acquired value. On the other hand, if a value of newly acquired monitor data is greater than the current minimum value, the minimum value updating process is not conducted. The cumulative value updating process is performed to add a value of newly acquired monitor data to a current cumulative value of monitor data to generate a newly updated cumulative value. Further, at this time, a cumulation number of the monitor data is incremented by "1" and is registered in a counter 292. The above process of updating the maximum and minimum values and the cumulative value may be performed until a predetermined cycle for generating package data lapses. If the predetermined cycle (e.g., 1 second) lapses, the average value calculating process is performed to calculate the average value by dividing the cumulative value of the monitor data by the cumulation number.

The generated package data may include a package date generating time that specifies the generation time of each package data or the like. The generated package data may further include an apparatus ID for specifying the substrate processing apparatus 100 that is a data generating source, a recipe ID for specifying the process recipe which, when the data is generated, the substrate processing apparatus 100 is operated based on, and a time period lapsed from the start time of the substrate processing process to the generation time of the data.

In addition, the controller 240 includes a communication control unit 239b that is connected to the display device control unit 239 used as the main controller. The communication control unit 239b is connected to a group management apparatus 500 (which will be described later) so that they can exchange data with each other through a network 400. In the present embodiment, the communication control unit 239b is configured to receive the package data generated by the controller 240 to transmit them to the group management apparatus 500.

(6) Configuration of the Group Management Apparatus

The following is a description of the group management apparatus 500 according to the present embodiment referring to in FIG. 1, wherein the group management apparatus 500 is configured to exchange data with the above-mentioned substrate processing apparatus 100.

The group management apparatus 500 may be configured using a computer that includes a control unit 501 implemented by a central process unit (CPU), a memory including therein a shared memory area 502, a data holding unit 503 used as a storage means, configured as a memory device such as HDD or the like, a data display unit 505 such as a display device or the like, an input means 506 such as a keyboard or the like, and a communication control unit 504 as a communication means. The memory, the data holding unit 503, the data display unit 505, the input means 506, the communication control unit 504 as explained above are configured to exchange data with the control unit 501 through internal buses or the like. Further, the control unit 501 has a clock function (not shown).

Stored in the data holding unit 503 are various group management programs (not shown). Each group management program is read from the data holding unit 503 to the above-mentioned memory and is performed by the control unit 501. The present embodiment is configured to implement various functions such as a graph creating function 550 or the like which will be described later.

The communication control unit 504 is configured to receive the monitor data from the substrate processing apparatus 100. In the present embodiment, the communication control unit 504 as the communication means is connected to the communication control unit 239b of the controller 240. The communication control unit 504 according to the present embodiment is configured to receive the package data from the substrate processing apparatus 100 to transmit them to the shared memory 502.

The control unit 501 is configured to readably store the monitor data received from the substrate processing apparatus 100 in the data holding unit 503. In the present embodiment, the control unit 501 is configured to read the package data stored in the shared memory 502 and configured to store them in the data holding unit 503 in a readable manner. In one embodiment, the package data may be converted to a database form associated with the package data generation time, the apparatus ID, the recipe ID, the lapsed time period and the like, which may be stored in the data holding unit 503.

Further, the control unit 501 is configured to allow the data display unit 505 to display the monitor data to be stored in the data holding unit 503. The control unit 501 according to the present embodiment transmits the package data (to be stored in the data holding unit 503) to the data display unit 505. The data display unit 505 is configured to display the package data thus transmitted on a display screen.

(Graph Creating Function)

Further, in the present embodiment, the control unit 501 may perform the graph creating function 550 for reading and visualizing the package data stored in the data holding unit 503.

Specifically, the graph creating function 550 is performed to receive data retrieving condition such as an apparatus ID and a particular time period through the input means, retrieve package data stored in the data holding unit 503 to search for package data meeting the data retrieving condition, and read searched package data from the data holding unit 503, the searched package data being associated with the package data generation time, the monitor data acquiring time, the apparatus ID, the recipe ID, the lapsed time period and the like.

The graph creating function 550 is configured to visualize the package data thus read by arranging the respective value items (the maximum value, the average value, and the minimum value) as a time series of data associated with the start time and the other time information, thereby creating a time series graph. The graph creating function 550 is further configured to allow the data display unit 505 to display the time series graph thus created.

(7) Data Processing Method

Figure 3:
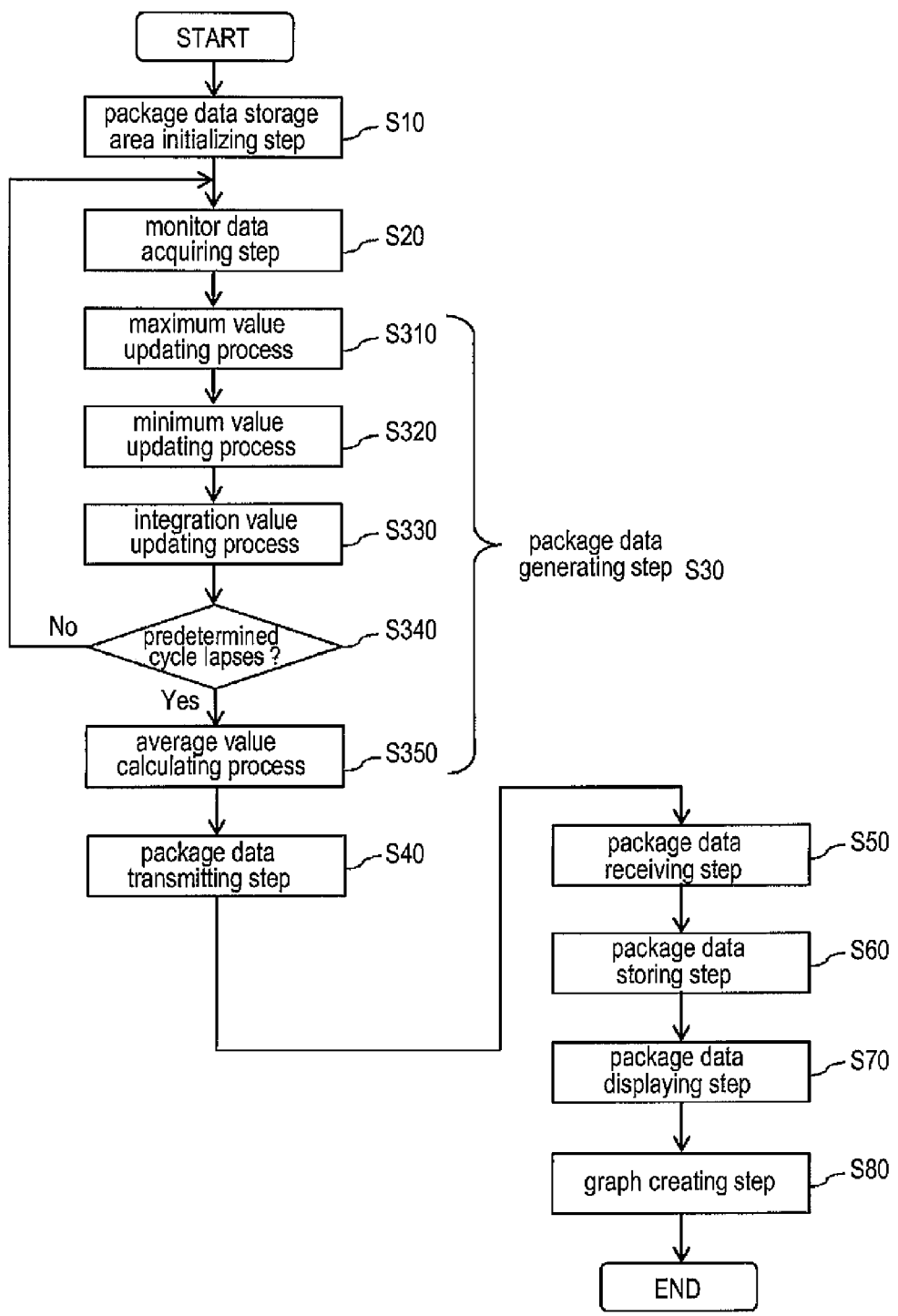
FIG. 3 illustrates a flowchart of a data processing method according to the present embodiment.

The following is a description of a data processing method in the substrate processing system according to the present embodiment with reference to the drawings. FIG. 3 is a flowchart of a data processing method according to the present embodiment. FIGS. 4 to 8 are flowcharts for specifically explaining the data processing method according to the present embodiment.

As illustrated in FIG. 3, the data processing method in the substrate processing system according to the present embodiment includes a package data storage area initializing step S10, a monitor data acquiring step S20, a package data generating step S30, a package data transmitting step S40, a package data receiving step S50, a package data storing step S60, a package data displaying step S70, and a graph creating step S80. In the package data storage area initializing step S10, data stored in a package data storing area is erased. In the monitor data acquiring step S20, monitor data representing at least the condition of each component of the substrate processing apparatus 100 is acquired. In the package data generating step S30, package date is generated, which aggregates a plural number of monitor data generated in the substrate processing apparatus 100 and includes at least one of the maximum, the average and the minimum value. In the package data transmitting step S40, the package data thus generated is transmitted from the substrate processing apparatus 100 to the group management apparatus 500. In the package data receiving step S50, the package data is received from the substrate processing apparatus 100 in the group management apparatus 500. In the package data storing step S60, the package data is stored in the data holding unit 503. In the package data displaying step S70, the package data stored in the data storing unit 503 is displayed on the data display unit 505. In the graph creating step S80, the package data stored in the data holding unit 503 is read to be visualized. These steps S10 to S80 will now be described in more detail.

(Package Data Storage Area Initializing Step S10)

Figure 4:
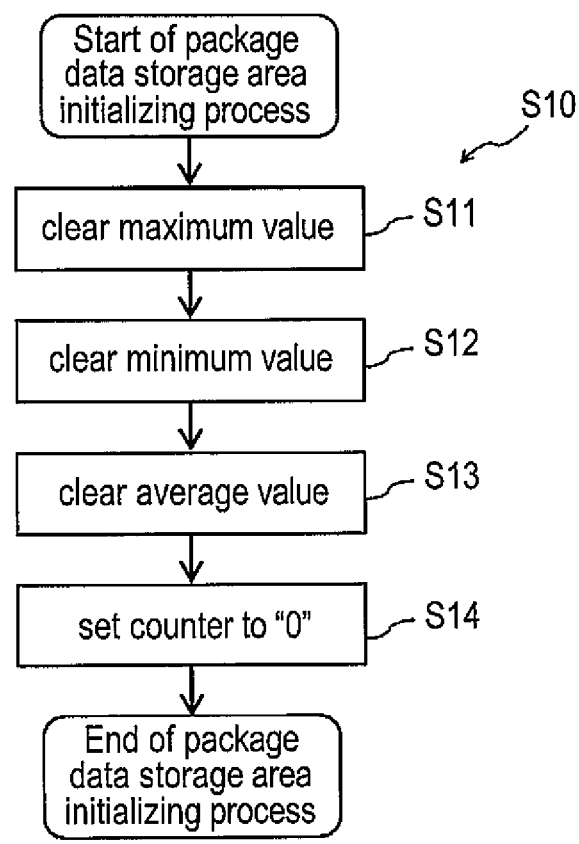
FIG. 4 is a flowchart showing a more detailed configuration of the data processing method according to the present embodiment.

The package data storage area initializing step S10 is a preliminary step for generating package data, which is performed to erase the data stored in the package data storing region 291 and the counter 292 as shown in FIG. 2. Specifically, in the package data storage area initializing step S10, steps S11 to S14 as shown in FIG. 4 are performed. At step S11, data stored in the maximum value storing area 291a of the package data storing region 291 is erased. At step S12, data stored in the minimum value storing area 291c of the package data storing region 291 is erased. At step S13, data stored in the average value storing area 291b of the package data storing region 291 is erased. At step S14, the cumulation number (or counter number) of monitor data stored in the counter 292 is reset to be "0." When these steps are completed, the package data storage area initializing process S10 is ended. By performing the package data storage area initializing step S10, various data associated with the package data generated in the previous cycle is erased and the generation of package data is ready to be performed in a subsequent cycle.

(Monitor Data Acquiring Step S20)

The monitor data acquiring step S20 is a step of acquiring monitor data representing the progress state of the substrate processing process and the condition of the substrate processing apparatus 100. Specifically, the controller 240 acquires monitor data representing the conditions (temperature, gas flow rate, pressure and the like) of the process furnace 202, which are received from at least the I/O control unit (the gas flow rate control unit 235, the pressure control unit 236, the temperature control unit 237) or the mechanism control unit.

(Package Data Generating Step S30)

The package data generating step S30 is a step of generating package data by aggregating the monitor data acquired in the monitor data acquiring step S20. The package data generating step S30, as shown in FIG. 3, includes a maximum value updating process S310 of comparing the acquired monitor data with a last-updated maximum value, a minimum value updating process S320 of comparing the acquired monitor data with a last-updated minimum value, a cumulative value updating process S330 of adding the acquired monitor data to a current cumulative value of monitor data, a step S340 of determining whether a predetermined cycle of acquiring monitor data lapses, and an average value calculating process S350 of calculating the average value based on the cumulative value.

Figure 5:
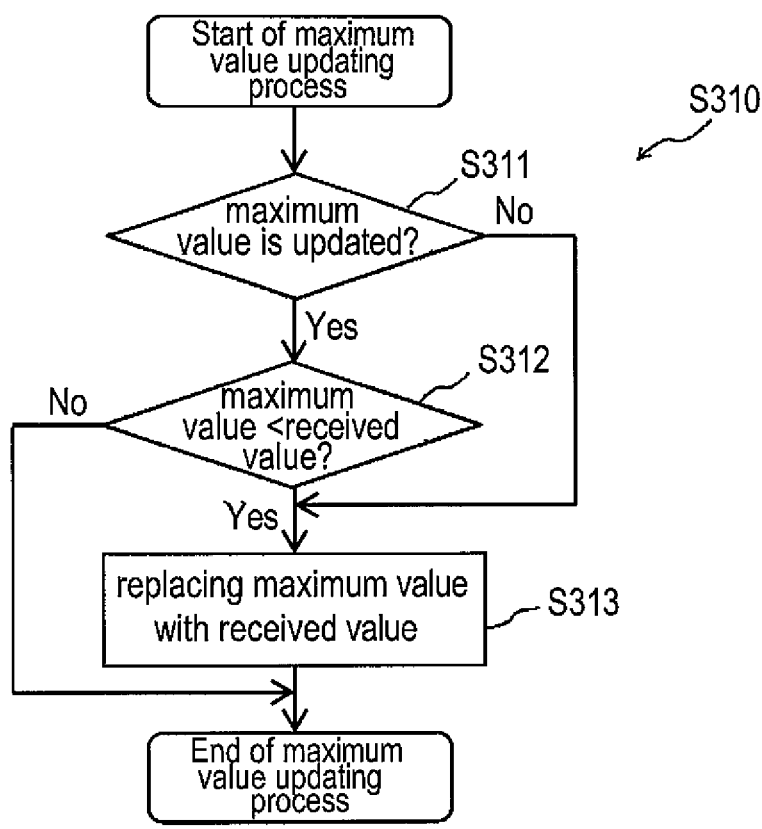
FIG. 5 is a flowchart showing a more detailed configuration of the data processing method according to the present embodiment.

In the maximum value updating process S310, steps S311 to S313 are performed as shown in FIG. 5. At step S311, it is determined whether the maximum value has been already updated (or registered). Specifically, it is determined whether the maximum value, i.e., an object for comparison with the acquired monitor data, has been stored in the maximum value storage area 291a of the package data storing region 291. As a result, if it is determined that the maximum value has not been stored in the maximum value storing area 291a, in other words, if it is determined that the acquired monitor data is an initial monitor data within the current cycle, the process goes to step S313 ("No" in the flowchart). At step S313, the maximum value is updated in the maximum value updating process by storing the acquired monitor data in the maximum value storing area 291a. When the maximum value updating process has been performed, the maximum value updating process S310 is ended. On the other hand, if it is determined that the maximum value has been already updated (or registered), namely, if it is determined that the current monitor data is secondly or later acquired one within the current cycle, the process moves on to step S312 ("Yes" in the flowchart).

At step S312, the acquired monitor data and the maximum value stored in the maximum value storing area 291a are compared with each other. As a result, if the acquired monitor data is greater than the maximum value stored in the maximum value storing area 291a, the process goes to step S313 ("Yes" in the flowchart). As explained above, at step S313, the maximum value is updated in the maximum value updating process by storing the acquired monitor data in the maximum value storing area 291a. When the process of updating the maximum value has been performed, the maximum value updating process S310 is ended. On the other hand, if the acquired monitor data is smaller than the maximum value stored in the maximum value storing area 291a, the process proceeds along "No" in the flowchart and the maximum value updating process S310 is ended. In this case, the maximum value is not updated, and the current maximum value is maintained as stored in the maximum value storing area 291a.

Figure 6:
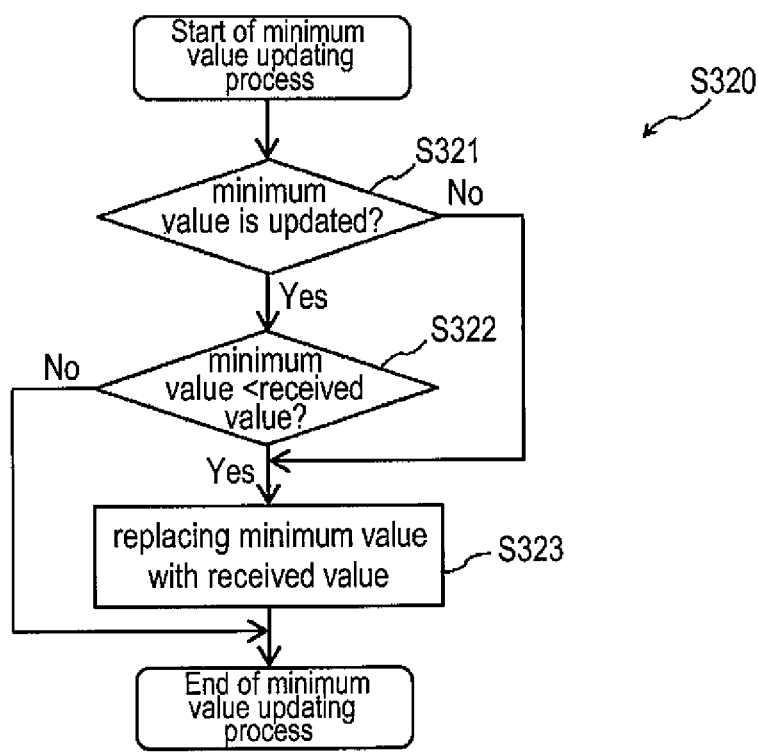
FIG. 6 is a flowchart showing a more detailed configuration of the data processing method according to the present embodiment.

If the maximum value updating process S310 is ended, the minimum value updating process S320 is subsequently performed on the same monitor data. In the minimum value updating process S310, as shown in FIG. 6, steps S321 to S323 are performed. At step S321, it is determined whether the minimum value has been already updated (or registered). To be more specific, it is determined whether the minimum value, i.e., an object for comparison with the acquired monitor data, has been stored in the minimum value storage area 291c of the package data storing region 291. As a result, if it is determined that the minimum value has not been stored in the minimum value storing area 291c, in other words, if it is determined that the acquired monitor data is an initial monitor data within the current cycle, the process goes to step S323 ("No" in the flowchart). At step S323, the minimum value is updated in the minimum value updating process by storing the acquired monitor data in the minimum value storing area 291c. When the minimum value updating process has been performed, the minimum value updating process S320 is ended. On the other hand, if it is determined that the minimum value has been already updated (or registered), namely, if it is determined that the current monitor data is secondly or later acquired one within the current cycle, the process moves on to step S322 ("Yes" in the flowchart).

At step S322, the acquired monitor data and the minimum value stored in the minimum value storing area 291c are compared with each other. As a result, if the acquired monitor data is smaller than the minimum value stored in the minimum value storing area 291c, the process goes to step S323 ("Yes" in the flowchart). As described above, at step S323, the minimum value is updated in the minimum value updating process by storing the acquired monitor data in the minimum value storing area 291c. When the minimum value updating process has been performed, the minimum value updating process S320 is ended. On the other hand, if the acquired monitor data is greater than the minimum value stored in the minimum value storing area 291c, the process proceeds along "No" in the flowchart and the minimum value updating process S320 is ended. In this case, the minimum value is not updated, and the minimum value is maintained as stored in the minimum value storing area 291c.

Figure 7:
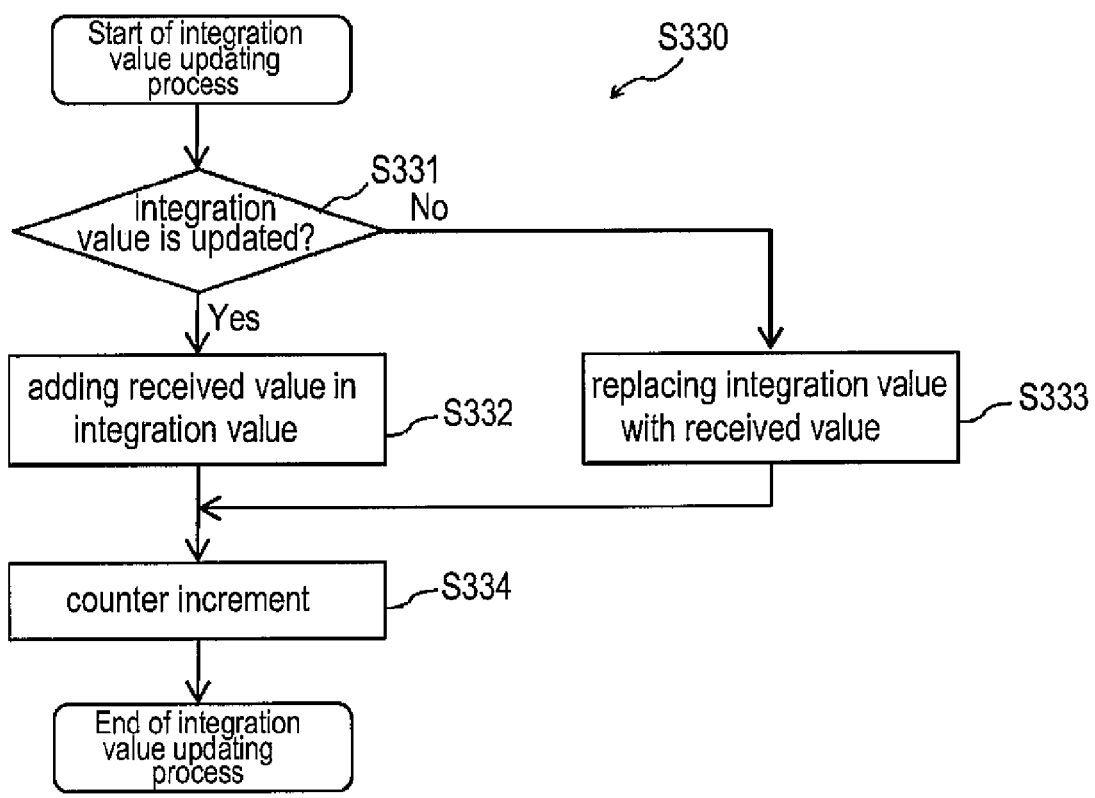
FIG. 7 is a flowchart showing a more detailed configuration of the data processing method according to the present embodiment.

If the minimum value updating process S320 is ended, the cumulative value updating process 330 is subsequently conducted on the same monitor data. In the cumulative value updating process S330, as shown in FIG. 7, steps S331 to S334 are performed. At step S331, it is determined whether the cumulative value has been already updated (or registered). Specifically, it is determined whether the acquired monitor data and the cumulative value to be added has been stored in the average value storing area 291*b* of the package data storing region 291. As a result, if it is determined that the cumulative value is not stored in the average value storing area 291*b*, that is, if it is determined that the acquired monitor data is an initial monitor data within the current cycle, the process goes to step S333 ("No" in the flowchart). At step 333, the cumulative value is updated by storing the acquired monitor data in the average value storing area 291*b*. When the cumulative value is updated, the process flows to step S334. At step 334, the cumulation number (counter number) of the monitor data (associated with the calculation of the cumulative value) is stored in the counter 292 as shown in FIG. 2. Specifically, the cumulation number stored in the counter 292 is incremented by "1" and a updated cumulation number is stored in the counter 292. Namely, in case the cumulation number has been set to "0" when the initial monitor data is acquired, the cumulation number is updated to be "1" by incrementing the number "0" by "1" and then stored in the counter 292 as a new cumulation number. If the new cumulation number is stored in the counter 292, the cumulative value renewal process S330 is terminated. On the other hand, if it is determined that the cumulative value has been already updated (or registered), namely, if it is determined that the current monitor data is secondly or later acquired one within the current cycle, the process moves on to S332 ("Yes" in the flowchart).

At step S332, the acquired monitor data is added to the cumulative value stored in the average value storing area 291*b* and as a result, a new cumulative value is calculated. By storing the new cumulative value in the average value storing area 291*b*, the cumulative value is updated. When the cumulative value thus updated is stored in the average value storing area 291*b*, the process proceeds to step S334 where a new cumulation number is stored in the counter 292. Thereafter, the cumulative value updating process S330 is ended.

When the cumulative value updating process S330 is ended, the process goes to step S340. It is determined at step S340 whether the current cycle for acquiring the monitor data has elapsed. Specifically, if it is determined that the current cycle has not been completed, the process returns to the monitor data acquiring process S20 along "No" in the flowchart where subsequent monitor data are acquired. Thereafter, the monitor data thus acquired is subsequently subjected to the maximum value updating process S310, the minimum value updating process S320 and the cumulative value calculating process S330. On the other hand, if it is determined that the current cycle has elapsed, the process goes to the average value calculating process S350 along "Yes" in the flowchart.

In the average value calculating process S350, the average value of the monitor data acquired within the current cycle is calculated. Specifically, the cumulative value stored in the average value storing area 291*b* is divided by the cumulation number stored in the counter 292, and the calculated average value is stored in the average value storing area 291*b*. That is, the cumulative value that has been stored in the average value storing area 291*b* is replaced by the calculated average value.

Thereafter, the values (including at least three calculation data of the maximum value, the average value, the minimum value) stored in the package data storing region 291 (291*a* to 291*c*) in the average value calculating process S350 makes up package data generated by aggregating the monitor data of the current cycle.

The package data thus generated may additionally include, e.g., a package data generating time period specifying the generation time of each package data. Moreover, the package data may further include the apparatus ID for specifying the substrate processing apparatus 100 that is a data generating source, the recipe ID for specifying the process recipe which, as the data is generated, the substrate processing apparatus 100 is performed based on, and the time period lapsed from the start time of the substrate processing process to the generation time of the data.

(Package Data Transmitting Step S40)

Figure 8:
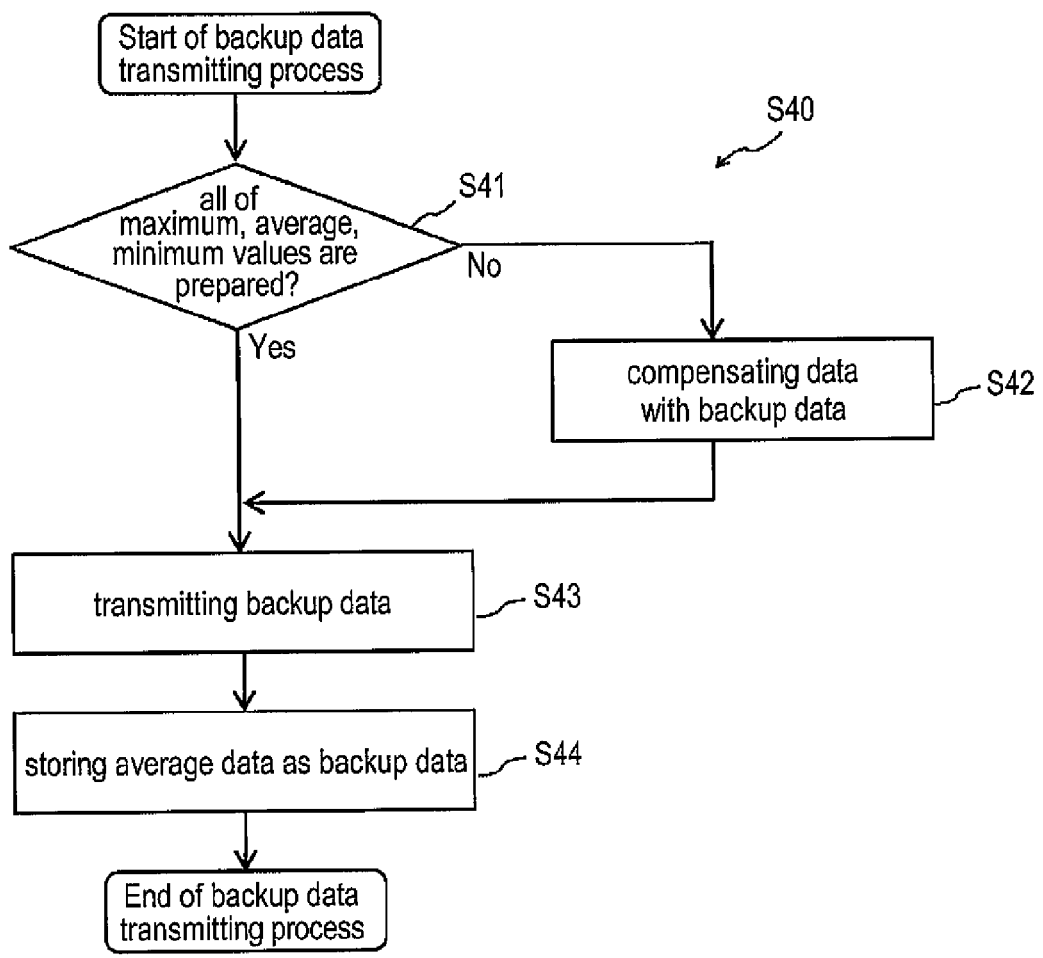
FIG. 8 is a flowchart showing a more detailed configuration of the data processing method according to the present embodiment.

The package data transmitting step S40 is a step of transmitting the package data from the substrate processing apparatus 100 to the group management apparatus 500. The package data transmitting step S40, as shown in FIG. 8, includes a step S41 of determining whether the package data values (including at least three calculation data of the maximum, the average, and the minimum value) are prepared, a step S42 of supplementing omitted data if it is determined that the package data values are not prepared, a step S43 of transmitting the package data to the group management apparatus 500, and a step S44 of backing up the average value of the transmitted package data.

At step S41, it is determined whether the package data values are prepared. This is a step provided for preventing any errors in transmitting the package data to the group management apparatus 500. Such transmission errors may be caused by unknown factors. For example, the transmission errors may occur when the I/O control unit (the gas flow rate control unit 235, the pressure control unit 236, and the temperature control unit 237) or the mechanism control unit 238 could not acquire the monitor data, or the package data could not be properly generated from the acquired monitor data. At step S41, if it is determined that the maximum, the average, and the minimum value are respectively stored in the maximum value storing area 291*a*, the average value storing area 291*b*, and the minimum value storing area 291*c* within the package data storing region 291, the process proceeds step S43 along "Yes" in the flowchart. At step S43, the package data stored in the package data storing region 291 are transmitted to the communication control unit 239*b* and to the group management apparatus 500 through the network 400. When the package data are transmitted to the group management apparatus 500, the process moves on to step S44.

At step S44, the average value stored in the average value storing area 291*b* is stored in the controller 240. Specifically, the controller 240 reads the average value stored in the average value storing area 291*b* and the average value thus read is stored (or held) in the controller 240 as the backup data. The backup data may be used in supplementing (or compensating) any data missed in case, due to unknown errors, a part of the values (the maximum, the average, and the minimum values) of the package data in the course of generating package data in a subsequent cycle. When the backup data is stored in the controller 240, the backup date transmitting step S40 is ended.

On the other hand, as a result of retrieving the data stored in the package data storing region 291, if it is determined that at least a part of the maximum, the average, and the minimum values (which are respectively stored in the maximum value storing area 291*a*, the average value storing area 291*b*, and the minimum value storing area 291*c*) are missed, the process goes to step S42 along "No" in the flowchart. At step S42, the missed values are compensated by storing the above-mentioned backup date in the storing areas 291*a* to 291*c* where the missed values are to be stored, thereby generating the package data without any missing data. In one embodiment, in the locations of the storing areas where the missed values are to be stored in the current cycle, the average value of the monitor data generated in the previous cycle may be stored. If the compensation of any missed data in the package data is completed, the process flows to step S43, where the package data is transmitted to the group management apparatus 500. When the package data is transmitted to the group management apparatus 500, the process proceeds to step S44, where the average value stored in the average value storing area 291b is stored (or held) in the controller 240 as the backup data. When the backup data is stored in the controller 240, the backup data transmitting step S40 is ended.

(Package Data Receiving Step S50)

The package data receiving step S50 is a step of receiving the package data from the substrate processing apparatus 100. Specifically, the communication control unit 504 of the group management apparatus 500 receives the package data from the substrate processing apparatus 100. The communication control unit 504 transmits and stores the package data received from the substrate processing apparatus 100 in the shared memory 502.

(Package Data Storing Step S60)

The package data storing step S60 is a step of storing the package data received from the substrate processing apparatus 100 in the data holding unit 503. In the present embodiment, the control unit 501 of the group management apparatus 500 reads the package data stored in the shared memory 502. The control unit 501 transmits the package data thus read to the data holding unit 503 to readably store the same therein. Further, if the package data has been associated with the package data generation time, the apparatus ID, the recipe ID, the lapsed time period and the like, the package data in combination with the associated information is converted to a database form to be readably stored in the data holding unit 503.

(Package Data Displaying Step S70)

The package data displaying step S70 is a step of displaying the package data stored in the data holding unit 503 on the data display unit 505. In the present embodiment, the control unit 501 receives input information (input information such as operation commands or the like) from the input means 240b manipulated by the operator, and reads the package data stored in the data holding unit 503 and transmits the package data thus read to the data display unit 505. Then, the data display unit 505 displays the package data received from the control unit 501 on a display screen. In this case, any associated information such as the package data generation time, the monitor data acquiring time, the apparatus ID, the recipe ID, the lapsed time period and the like may be displayed together with the package data.

(Graph Creating Step S80)

The graph creating step S80 is a step of reading and visualizing the package data stored in the data holding unit 503. In the graph creating step S80, the control unit 501 receives the input information, i.e., data retrieving conditions such as the apparatus ID and the preset time period, by way of the input means 506, retrieves data stored in the data holding unit 503, and reads from the data holding unit 503 the package data associated with the package data generation time, the monitor data acquiring time, apparatus ID, the recipe ID, the lapsed time period and the like. Thereafter, the control unit 501 creates a time series graph by arranging a time series of package data with related value items (the maximum, the average, and the minimum value) generated from the start time (based on the time information) and visualizing the package data. Furthermore, the control unit 501 displays the time series data thus created on the data display unit 505.

(9) Effects According to the Present Embodiment

The present embodiment may have at least one of the following effects.

In the substrate processing system, even in case the frequency of acquiring the monitor data within the predetermined cycle increases, such monitor data can be at least aggregated and represented by the maximum, the average, and the minimum values of the package data, and it is possible to suppress an increase in the data amount. In addition, if the frequency of acquiring the monitor data within the predetermined cycle further increases, such monitor data can be aggregated into the package data and thus it is possible to suppress an increase in the data amount more effectively.

In addition, according to the present embodiment, the package data includes at least the maximum, the average, and the minimum values of the monitor data within the preset time period. Therefore, while suppressing an increase in the data amount, any change in the condition of the substrate processing apparatus 100 can be detected with substantially the same precision as the case of analyzing the entire monitor data.

Figure 9B:
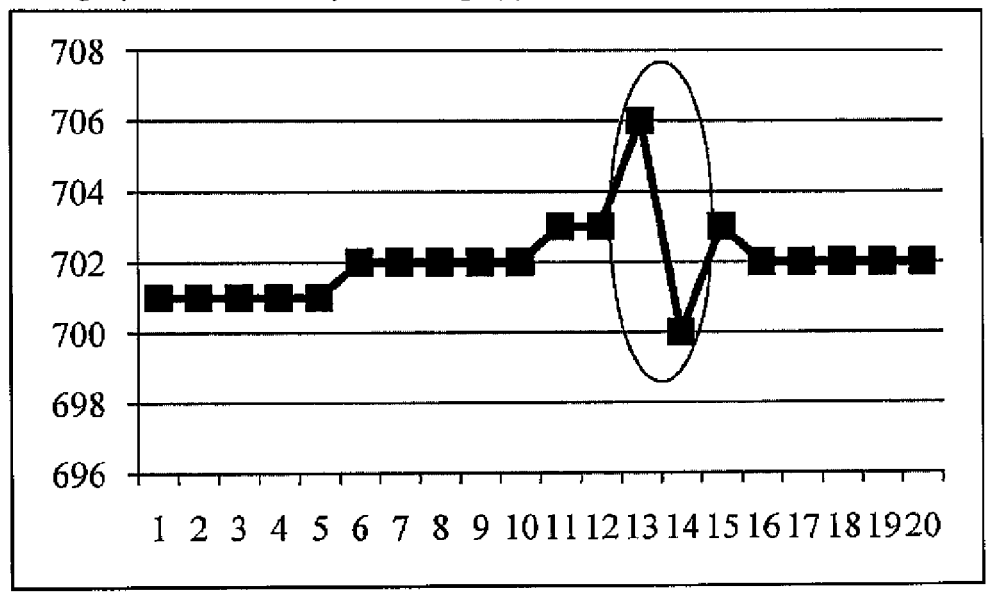
Figure 9C:
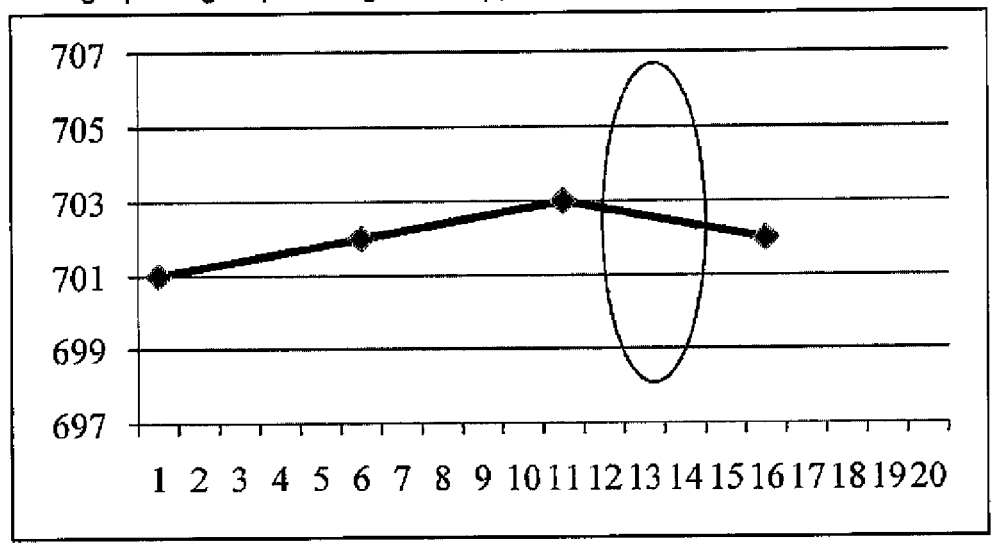
Figure 10B:
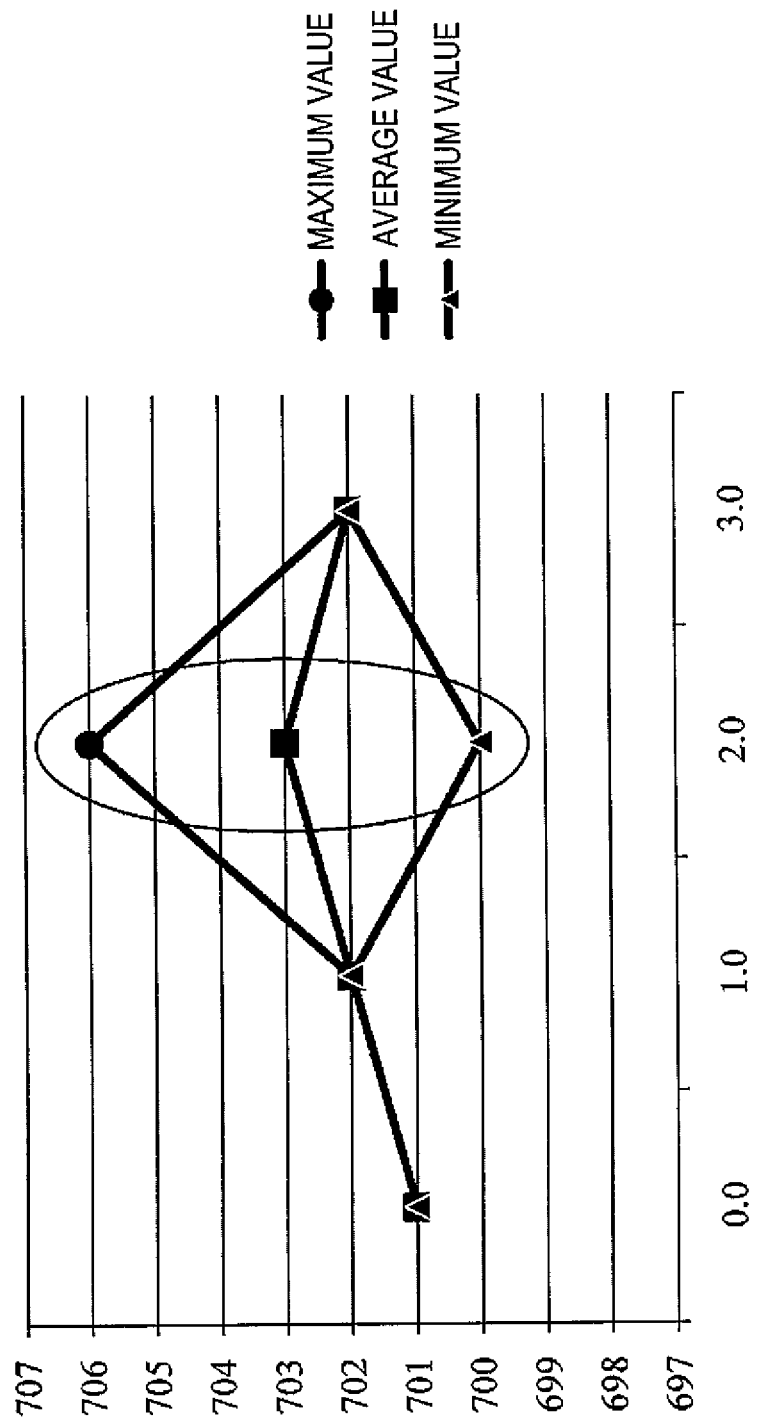

The above-described effects will now be explained with reference to certain examples. FIGS. 9A-9C and 10A-10B illustrate some effects according to the present embodiment. Specifically, FIG. 9A illustrates a data table generated in a case where monitor data are acquired in every 2 seconds. If the entire set of the acquired monitor data is analyzed, it is possible to observe any change in the condition of each of the components of the substrate processing apparatus 100, as illustrated in FIG. 9B. In the conventional technique that, in order to reduce the load in the network 400, executes the data analysis process by using the monitor data thinned out every 1 second, however, it is difficult to observe the change in the condition of each of the components of the substrate processing apparatus 100, as demonstrated in the graph of FIG. 9C. In contrast, if the monitor data processing process is performed and the monitor data acquired within a predetermined cycle (1 second) is aggregated and represented by the maximum, the average, the minimum of values as shown in the table of FIG. 10A, it becomes possible to detect the change in the conditions of the respective components of the substrate processing apparatus 100 in the predetermined cycle.

Further, under such a configuration, since the data amount of the package data transmitted to the group management apparatus 500 through the network 400 is more reduced than the case of transmitting the entire monitor data, it becomes possible to reduce the load in the network 400. As a result, the occurrence of delay in receiving and transmitting the data can be suppressed, which, in turn, can suppress so-called "data missing" representing errors in receiving and transmitting data due to the occurrence of the delay.

Figure 11A:
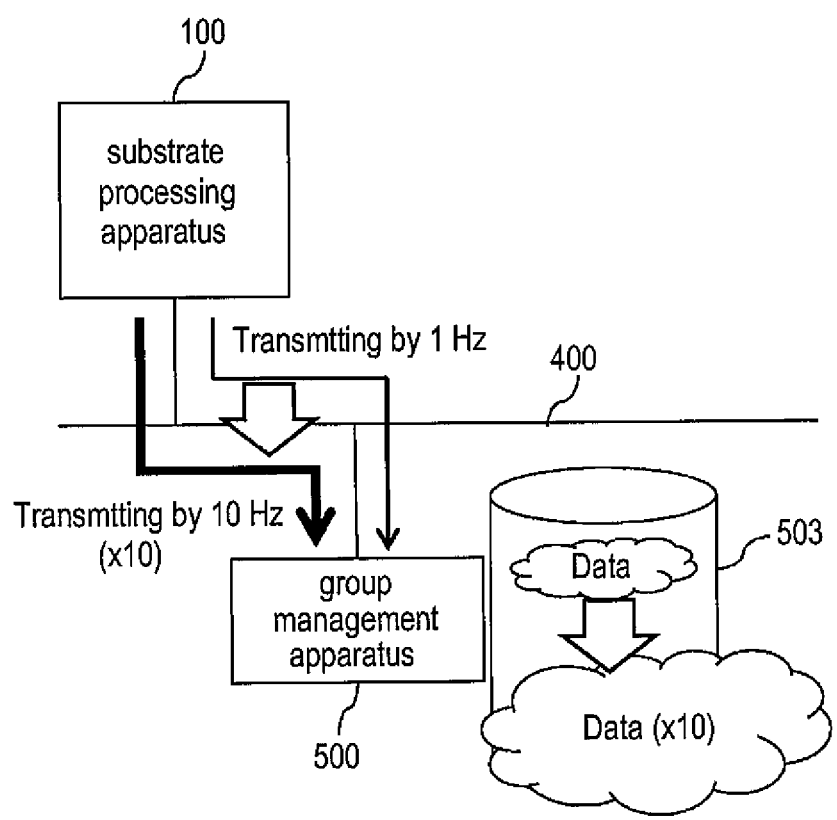
FIGS. 11A and 11B are views explaining the effects according to the present embodiment.
Figure 11B:
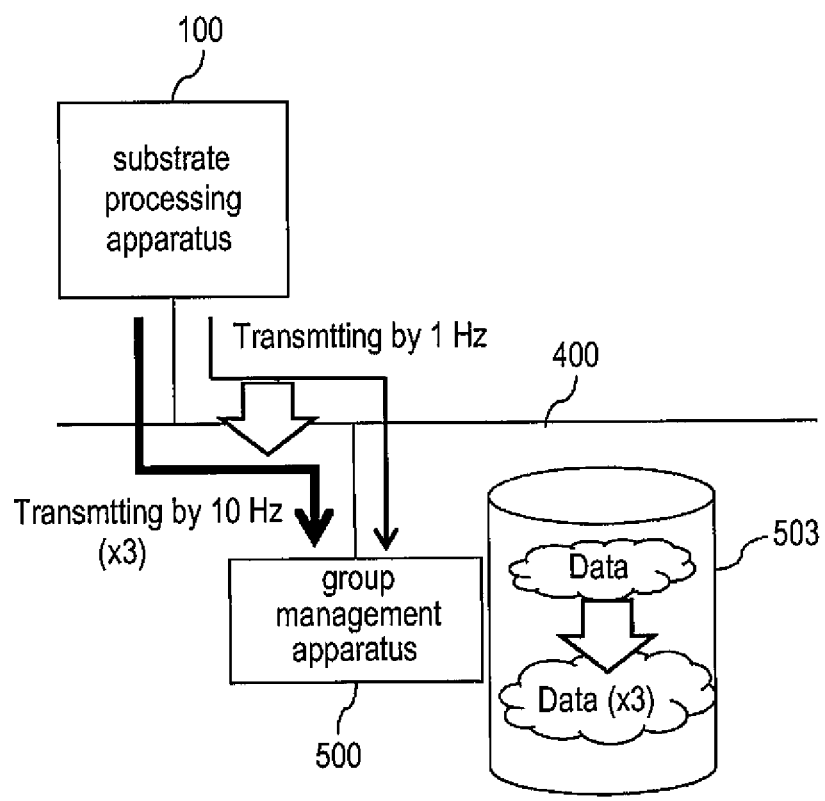

The above-described effects will now be explained with reference to another example. FIGS. 11A and 11B illustrate some configurations explaining the effects according to the present embodiment. If the time period for acquiring the monitor data is shortened from 1 second (1 Hz) to 0.1 second (10 Hz), the frequency of acquiring the monitor data in the predetermined cycle becomes ten times as shown in FIG. 11A, which, in turn, increases the data amount by ten times (×10). In accordance with the present invention, however, even in case the time period for acquiring the monitor data is set to 0.1 second (10 Hz), the acquired monitor data are aggregated into the package data with three representative values (the maximum, the average, and the minimum values). Consequently, the data amount is reduced by three times (×3) as shown in FIG. 11B. Namely, in this case, the data amount is suppressed to ⅓ or less in comparison with a case that every acquired monitor data is transmitted to the group management apparatus 500.

Further, in this configuration, since the data amount to be managed by the substrate processing apparatus 100 is reduced, it is possible to carry out the substrate process without additionally providing storage capacity (e.g., the storage capacity of the data holding unit 239e). This prevents "system shutdown" caused by overflow in usage of the storage capacity. It is also possible to avoid any cost required for additionally providing the storage capacity.

Further, in this embodiment, since the data amount to be managed by the group management apparatus 500 is reduced, it is possible to operate the substrate processing system without additionally providing storage capacity (e.g., the storage capacity of the data holding unit 503). This prevents "system shutdown" caused by overflow in usage of the storage capacity. It is also possible to avoid any cost required for additionally providing the storage capacity.

(b) The substrate processing apparatus 100 according to the present embodiment is configured to store the average value of the predetermined cycle in the controller 240 as the package data. Further, in case a part of the package data values (the maximum, the average, and the minimum values) are missed, the missed portion can be compensated by backup data.

Since, under such a configuration, the package data is generated without any missed portion, it is possible to suitably process the package data. For example, in case a part of the package data is missed and the package data is displayed on the screen in the group management apparatus 500, the operator of the group management apparatus 500 may possibly misconceive that an abnormality is generated in the substrate processing apparatus 100. Further, if the data is partially missed, the graph created based on such data may have some incomplete or discontinuous portions. For this reason, the operator of the group management apparatus 500 may misconceive that an abnormality is generated in the substrate processing apparatus 100. However, if the missed data is compensated by the backup data as in the present embodiment, it is possible to prevent any misconceptions as mentioned above.

(c) The group management apparatus 500 transmits the package data stored in the data holding unit 503 from the control unit 501 to the data display unit 505, or reads the package data stored in the data holding unit 503 to the control unit 501 to transmit the same to the data display unit 505, thereby displaying the package data on the screen of the data display unit 505. The group management apparatus 500 is configured to create a time series graph for each of the maximum, the average, and the minimum values based on the package data that are read from the data holding unit 503, and allows the data display unit 505 to display the graph thus created.

In this configuration, since the package data received from the substrate processing apparatus 100 are displayed on the data display unit 505, the operator of the group management apparatus 500 can detect any change in the condition of the substrate processing apparatus 100 with the substantially same precision as the case of receiving the entire monitor data.

Further, under this configuration, the package data that are stored in the data holding unit 503 is read and the graph is created for each of the maximum, the average, and the minimum values. Accordingly, the package data becomes visualized, which helps the operator of the group management apparatus 500 to analyze the package data rapidly, thereby resulting in detecting any change in the condition of the substrate processing apparatus 100 precisely.

(A Second Embodiment According to the Present Disclosure)

A second embodiment of the present disclosure will now be described with reference to the drawings.

In the substrate processing system of the present embodiment, the substrate processing apparatus 100 transmits a plural number of monitor data, which are acquired by the controller 240, to the group management apparatus 500. The group management apparatus 500 is configured in such a way to receive the monitor data from the substrate processing apparatus 100, aggregate the plural number of monitor data thus received, and generate package data including at least a maximum, an average, and a minimum values.

Under such a configuration, even in case the frequency of acquiring the monitor data within the predetermined cycle increases, such data can be aggregated into the maximum, the average, and the minimum values of the package data, and it becomes possible to suppress an increase in the data amount. Further, even in case the number of acquiring the monitor data within the predetermined cycle is further increased, such monitor data can be aggregated into the package data to thereby suppress an increase in the data amount more effectively.

Further, under this configuration, the package data includes the maximum, the average, and the minimum values of the monitor data generated within the preset time period. Hence, the data analysis is conducted by using both the entire monitor data and package data, thereby detecting the change in the condition of each component of the substrate processing apparatus 100.

(Other Embodiments According to the Present Disclosure)

In the above-mentioned embodiments, the package data are generated in each predetermined cycle, while performing the maximum value updating process S310, the minimum value updating process S320 and the cumulative value updating process S330 whenever the monitor data are acquired, but the present disclosure is not limited thereto. For instance, after all of the monitor data generated within the predetermined cycle are acquired, they are collected and then the package data generating step S30 may be performed.

In the above-mentioned embodiments, after the monitor data within the predetermined cycle are acquired, the average value is calculated but the present disclosure is not limited thereto. For example, a storage area for storing the cumulative value and a storage area for storing the average value can be separately provided and, in this case, it is possible to store both of the cumulative value and the average value at the same time. Thus, whenever new monitor data are acquired, the average value can be calculated and stored.

In the above-mentioned embodiments, the package data storage area initializing step S10 is conducted right before the monitor data acquiring step S20, but the present disclosure is not limited thereto. That is, if the package data storage area initializing step S10 is performed only before the package data generation step S30 is carried out, it is possible to store the package data of each predetermined cycle in the package data storage region 291.

Although, in the above-mentioned embodiments, description has been described with respect to the case the package data includes the maximum, the average, and the minimum values of the monitor data within the predetermined cycle, the present disclosure is not limited thereto. Namely, the package data may include at least one of the maximum, the average, and the minimum values. Under such a configuration, it is possible to further suppress an increase in the data amount of the package data in comparison with the case of having the maximum, the average, and the minimum values. In addition, it becomes possible to further reduce the load in the network 400.

In the above-mentioned embodiments, the package data are generated by using the maximum, the average, and the minimum value of the monitor data but the present disclosure is not limited thereto. For example, the present disclosure may be configured that, from the maximum, the average, and the minimum values that has been generated, an area, a range, a standard deviation and the like representing the distribution of the monitor data are calculated to thereby produce the package data having these values. Moreover, the monitor data generated in the substrate process may be stored. For instance, the package data according to the present embodiment may be generated under the condition that, after installing another storage unit as a separate component or allowing the data holding unit 239e in the apparatus to have a dedicated storage area, the monitor data generated in the substrate process are stored therein.

The present disclosure is not limited to the case both the substrate processing apparatus 100 and the group management apparatus 500 are arranged in an identical floor (e.g., in an identical clean room). For instance, the present disclosure may be so configured that the substrate processing apparatus 100 is disposed in a clean room but the group management apparatus 500 is provided in an office (in a different floor from the clean room). In this case, the progress state of the substrate processing process and the condition of the substrate processing apparatus 100 can be remotely monitored.

Aside from the film forming process using CVD (Chemical Vapor Deposition) method, ALD (Atomic Layer Deposition), PVD (Physical Vapor Deposition) method, the present disclosure can be suitably applied to a substrate process such as a diffusion process, an annealing process, an oxidation process, a nitriding process, a lithograph process or the like. Further, the present disclosure, besides the film formation apparatus, can be also properly applied to an annealing process apparatus, an oxidation process apparatus, a nitriding process apparatus, an exposure apparatus, a coating applicator, a dryer, a heater or the like.

The present disclosure can be also suitably applied to a substrate processing apparatus that processes glass substrates such as LCD (Liquid Crystal Display) manufacturing apparatus or the like, apart from the substrate processing apparatus such as the semiconductor manufacturing apparatus according to the present invention or the like that processes the wafer substrates.

Although the embodiments according to the present disclosure has been specifically described as stated above, the present disclosure is not limited to the above-mentioned embodiments and may be varied in various ways without departing from the scope of the invention.

(Some Aspects of the Present Disclosure)

Hereinafter, some aspects of the present disclosure will be additionally stated.

[Additional Embodiment 1]

A first aspect of the present disclosure may provide a substrate processing system comprising a substrate processing apparatus configured to process a substrate and a group management apparatus that is connected to the substrate processing apparatus, wherein the substrate processing apparatus is configured to acquire a plurality of monitor data representing at least the condition of each component of the substrate processing apparatus, aggregate the plurality of the monitor data to generate package data including at least one of a maximum value, an average value, and a minimum value of the monitor data, and transmit the package data to the group management apparatus, wherein the group management apparatus is configured to receive the package data from the substrate processing apparatus and readably store the same therein.

[Additional Embodiment 2]

The substrate processing apparatus according to the additional embodiment 1 is configured to generate the package data in each predetermined cycle.

[Additional Embodiment 3]

Further, the substrate processing apparatus according to the additional embodiment 1 is configured to aggregate a plurality of monitor data to calculate the cumulative value, and divide the cumulative value by a cumulation number of the monitor data to calculate the average value, thereby generating the package data.

[Additional Embodiment 4]

Still further, the group management apparatus according to any one of the additional embodiments 1 to 3 is configured to visualize the package data that is stored in the group management apparatus.

[Additional Embodiment 5]

A second aspect of the present disclosure may provide a substrate processing apparatus configured to process a substrate, wherein the substrate processing apparatus acquires monitor data representing at least the condition of each component of the substrate processing apparatus, and generates package data including at least three calculation data of the maximum, the average, and the minimum value associated with first monitor data selected from a multiple number of monitor data.

[Additional Embodiment 6]

A third aspect of the present disclosure may provide a data processing method preformed by a substrate processing system equipped with a substrate processing apparatus configured to process a substrate and a group management apparatus that is connected to the substrate processing apparatus, the data processing method including: acquiring, by using the substrate processing apparatus, monitor data representing the progress state of the substrate process or the condition of the substrate processing apparatus; aggregating, by using the substrate processing apparatus, a plurality of monitor data to generate package data including at least one of a maximum value, an average value, and a minimum value of a monitor data; transmitting the package data to the group management apparatus by using the substrate processing apparatus; and receiving the package data from the substrate processing apparatus by way of the group management apparatus, and readably storing the same therein.

[Additional Embodiment 7]

A fourth aspect of the present disclosure may provide a display method of a substrate processing apparatus, wherein the substrate processing apparatus acquires monitor data representing at least the condition of each component of the substrate processing apparatus; generates package data including at least three calculation data of the maximum, the average, and the minimum value associated with first monitor data selected from a plural number of the monitor data; and visualizes and displays the package data.

According to the present disclosure, it is possible to detect the change in the condition of each component of the substrate processing apparatus while restraining the amount of data from being increased. In other words, while suppressing the increase of the data amount, it is possible to detect the change in the condition of each component of the substrate processing apparatus with precision comparable to the case of analyzing the entire monitor data.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate processing apparatus configured to generate package data including a maximum value, an average value, and a minimum value of monitor data associated with a condition of each component of the substrate processing apparatus in predetermined cycles, wherein the substrate processing apparatus acquires the monitor data representing at least the condition of each component of the substrate processing apparatus, updates the package data based on the monitor data acquired in each of the predetermined cycles, and stores the package data.

2. The substrate processing apparatus of claim 1, wherein the substrate processing apparatus is configured to aggregate a plurality of monitor data to calculate a cumulative value, and divide the cumulative value by a cumulation number of the monitor data to calculate the average value, thereby generating the package data.

3. A substrate processing system, comprising a group management apparatus that is connected to the substrate processing apparatus of claim 1,
wherein the substrate processing apparatus acquires a plurality of monitor data representing at least the condition of each component of the substrate processing apparatus, aggregates the plurality of the monitor data to generate package data including at least one of a maximum value, an average value, and a minimum value of the monitor data, and transmits the package data to the group management apparatus, and
wherein the group management apparatus is configured to receive the package data from the substrate processing apparatus and readably store the package data therein.

4. The substrate processing system of claim 3, wherein the group management apparatus is configured to visualize the package data that is stored in the group management apparatus.

5. The substrate processing system of claim 3, wherein the substrate processing apparatus transmits the monitor data and the package data to the group management apparatus.

6. The substrate processing system of claim 3, wherein the substrate processing apparatus transmits the package data to the group management apparatus while cumulating the monitor data.

7. The substrate processing apparatus of claim 1, wherein the average value is stored as a backup data.

8. A display method of a substrate processing apparatus configured to generate package data including a maximum value, an average value, and a minimum value of monitor data associated with a condition of each component of the substrate processing apparatus in predetermined cycles, the display method comprising:
acquiring monitor data representing at least the condition of each component of the substrate processing apparatus;
updating the package data based on the monitor data acquired in each of the predetermined cycles;
storing the package data; and
visualizing and displaying the package data.

* * * * *